US008862808B2

(12) United States Patent
Tsukamoto et al.

(10) Patent No.: US 8,862,808 B2
(45) Date of Patent: Oct. 14, 2014

(54) CONTROL APPARATUS AND CONTROL METHOD

(75) Inventors: Nina Tsukamoto, Kawasaki (JP); Yuji Hanaoka, Kawasaki (JP); Terumasa Haneda, Kawasaki (JP); Atsushi Uchida, Kawasaki (JP); Yoko Kawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 125 days.

(21) Appl. No.: 13/402,274

(22) Filed: Feb. 22, 2012

(65) Prior Publication Data

US 2012/0254636 A1 Oct. 4, 2012

(30) Foreign Application Priority Data

Mar. 28, 2011 (JP) .................................. 2011-070845

(51) Int. Cl.
*G06F 1/30* (2006.01)
*G06F 12/16* (2006.01)
*G06F 12/08* (2006.01)
*G06F 11/14* (2006.01)

(52) U.S. Cl.
CPC .............. *G06F 1/30* (2013.01); *G06F 12/0868* (2013.01); *G06F 11/1441* (2013.01); *G06F 2212/262* (2013.01); *G06F 2212/1032* (2013.01)
USPC .......................................... 711/103; 713/300

(58) Field of Classification Search
None
See application file for complete search history.

(56) References Cited

U.S. PATENT DOCUMENTS 7,873,853 B2 * 1/2011 Muraoka ........................ 713/340
2008/0104344 A1 * 5/2008 Shimozono et al. .......... 711/162
2008/0189484 A1 8/2008 Iida et al.
2008/0250189 A1 10/2008 Cheng
2010/0169556 A1 7/2010 Nakanishi et al.
2010/0180065 A1 * 7/2010 Cherian et al. ................ 711/103
2010/0241806 A1 * 9/2010 Kawano et al. ............... 711/118
2010/0306579 A1 * 12/2010 Baek et al. ......................... 714/6
2010/0318844 A1 12/2010 Matsuda et al.
2011/0010582 A1 1/2011 Tsukamoto et al.
2012/0017033 A1 * 1/2012 Moritoki ....................... 711/103

FOREIGN PATENT DOCUMENTS

JP          6-231053      8/1994
JP          9-330277      12/1997
JP       2006-59374       3/2006

(Continued)

OTHER PUBLICATIONS

Patent Abstracts of Japan, Publication No. 06-309234, Application No. 05-276826, Publication Date Apr. 11, 1994.

*Primary Examiner* — Charles Rones
*Assistant Examiner* — Tian-Pong Chang
(74) *Attorney, Agent, or Firm* — Staas & Halsey LLP

(57) ABSTRACT

A control apparatus includes a capacitor to store electric power supplied from the power supply unit and to supply the stored electric power to the control apparatus when the power supply from the power supply unit is stopped, a first nonvolatile memory, a second nonvolatile memory, a first controller, and a second controller. The first controller writes the data, stored in the cache memory, into the first nonvolatile memory when the external power supply is stopped verifies whether the data stored in the first nonvolatile memory is normal, and sends information of area where the data in the first nonvolatile memory is not normal when the verification indicates that the writing is not normal. And the second controller writes the information sent from the first controller into the second nonvolatile memory.

7 Claims, 19 Drawing Sheets

(56) References Cited

FOREIGN PATENT DOCUMENTS

| JP | 2008-192028 | 8/2008 |
| JP | 2008-541283 | 11/2008 |
| JP | 2010-86009 | 4/2010 |
| JP | 2010-152703 | 7/2010 |
| JP | 2011-18241 | 1/2011 |
| WO | 2009/098776 A1 | 8/2009 |

* cited by examiner

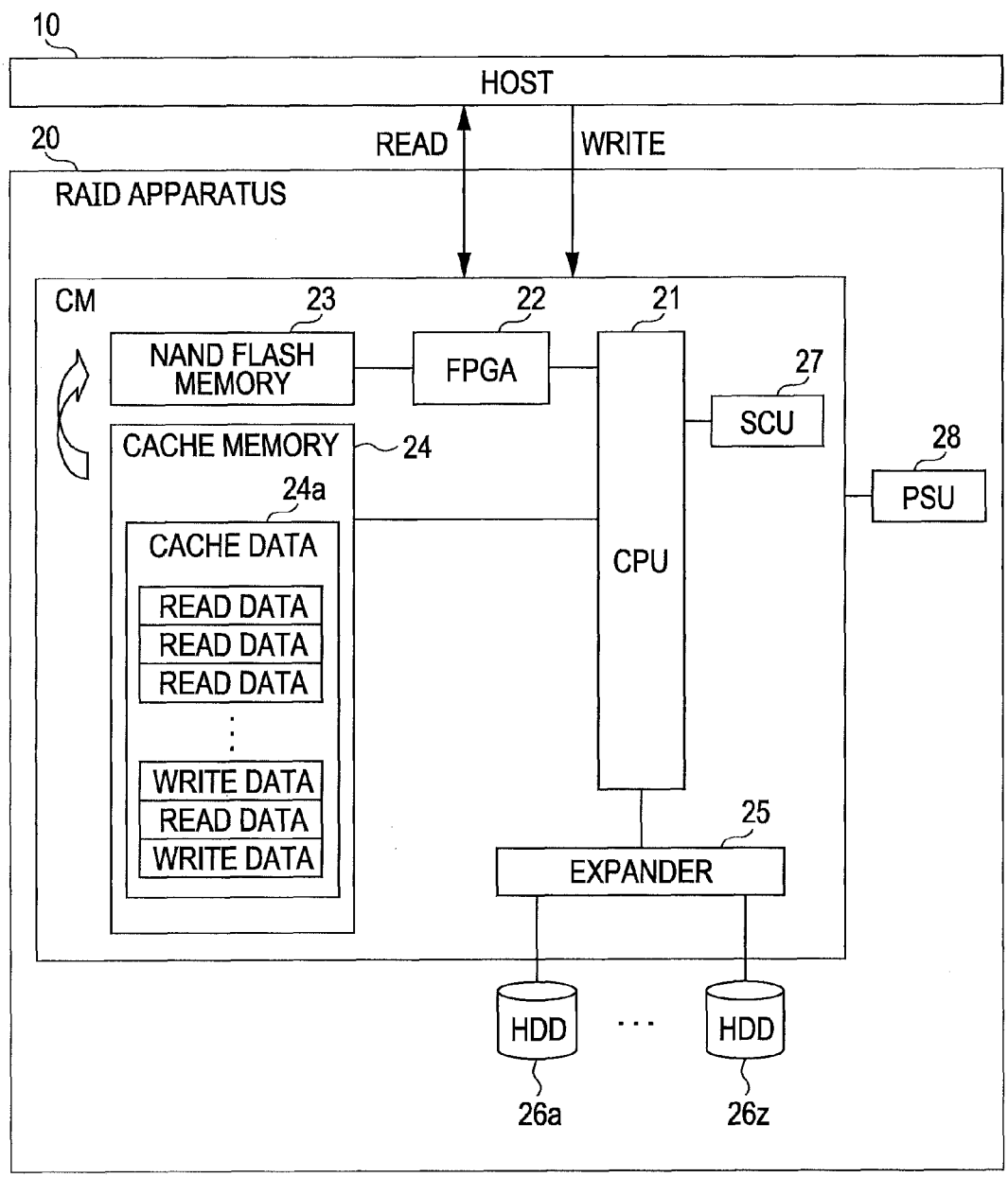

CONTROL APPARATUS AND CONTROL METHOD

CROSS-REFERENCE TO RELATED APPLICATION

This application is based upon and claims the benefit of priority of the prior Japanese Patent Application No. 2011-070845, filed on Mar. 28, 2011, the entire contents of which are incorporated herein by reference.

FIELD

The embodiment discussed herein is related to a control apparatus and a control method.

BACKGROUND

A RAID (Redundant Arrays of Independent Disks) has been widely known as a technology for building a high-speed, a large-capacity, highly reliable, improved disk system with a combination of multiple HDDs (Hard Disk Drives).

In general, a RAID apparatus uses a cache memory for performing reading and writing of user data in order to reduce a processing time for data access from a high-order apparatus (e.g., a host computer, simply referred to as a "host" hereinafter).

The cache memory is typically implemented by a semiconductor storage device, such as a DRAM (dynamic random access memory) or an SRAM (static random access memory).

When the RAID apparatus receives a user-data reading request from the host, the RAID apparatus searches the cache memory (which may simply be referred to as "cache" hereinafter) for user data corresponding to the reading request. Upon retrieving the corresponding user data, the RAID apparatus sends the retrieved cache data to the host.

When the RAID apparatus fails to retrieve the user data from the cache memory, the RAID apparatus retrieves corresponding user data stored on a hard disk device (which may simply be referred to as a "disk" hereinafter) and writes the retrieved user data to the cache memory.

When user data is stored in the cache memory upon reception of a user-data writing request from the host, the RAID apparatus notifies the host that the write processing is completed. Thereafter, when predetermined conditions are satisfied, the user data stored in the cache memory is stored onto the hard disk device.

Since the above-described cache memory is implemented by a volatile semiconductor storage device, the user data in the cache memory is erased when the power supply to the cache memory is stopped. Thus, during power failure, it is preferable that all data in the cache memory be saved to a nonvolatile storage device (e.g., a NAND flash memory or a CompactFlash® memory) for backup.

For example, as illustrated in FIG. 20, during power failure, a CPU (central processing unit) 21 in a RAID apparatus 20 controls an FPGA (field programmable gate array) 22, which performs writing processing on a NAND flash memory 23, to write and save cache data 24a, stored in a cache memory 24, to the NAND flash memory 23.

When power failure occurs, the power supply to the RAID apparatus 20 is switched from a PSU (power supply unit) 28 to an SCU (system capacity unit) 27 and the RAID apparatus 20 uses power stored in the SCU 27 to perform the data save processing.

Examples of related art include a technology for efficiently performing a write-back processing (for writing write data to a hard disk) to achieve a reduction in power during power failure (e.g., as disclosed in Japanese Laid-open Patent Publication No. 9-330277) and a technology for reallocating a logical disk device to a physical disk device on the basis of disk access information (e.g., as disclosed in Japanese Laid-open Patent Publication No. 2006-59374).

SUMMARY

According to an aspect of the invention, a control apparatus that saves data which is stored in a cache memory of a storage when a power supply from a power supply unit to the storage is stopped, the control apparatus includes a capacitor to store electric power supplied from the power supply unit and to supply the stored electric power to the control apparatus when the power supply from the power supply unit is stopped, a first nonvolatile memory, a second nonvolatile memory, a first controller, and a second controller. The first controller writes the data, stored in the cache memory, into the first nonvolatile memory when the external power supply is stopped verifies whether the data stored in the first nonvolatile memory is normal, and sends information of area where the data in the first nonvolatile memory is not normal when the verification indicates that the writing is not normal. And the second controller writes the information sent from the first controller into the second nonvolatile memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 illustrates related art.

DESCRIPTION OF EMBODIMENT

In order to efficiently save data in the cache memory in the RAID, a high-performance CPU is in many cases used and an internal or external memory is generally used to perform software processing. When a CPU is used to perform save processing, the amount of power consumed is large. Accordingly, it is desired to use an SCU having a largest possible capacity in order to perform appropriate save processing. However, as the capacity of the SCU increases, the size thereof also increases. Hence, the volume in which the SCU may be installed is limited and thus an increase in the capacity of the SCU is also limited.

Accordingly, during power failure, a controller dedicated to the function of the save processing, instead of the CPU, may also be used to perform transfer to reduce the power consumption.

On the other hand, since NAND flash memories are typically low in reliability compared to general memories, a failure may occur in a write area during writing and thus a writing error may occur. Thus, during writing to the NAND flash memory, it is preferable that information of an area in which a write error occurred be stored so that the area is not used during the next saving.

As described above, when a high-performance processor such as a CPU is used, it is easy to perform save-processing while recording and managing an error log, as appropriate, through software processing or the like. However, when a dedicated controller is used, it is desirable that, in terms of limiting the functionality, the error log be collected with more simplified functionality.

In view of the foregoing situation, the present technology provides a save-processing device that allows an error log to be recoded with a simple configuration.

A save-processing device and a save-processing method disclosed herein will be described below. The present technology, however, is not limited to the embodiment described below.

Figure 1:
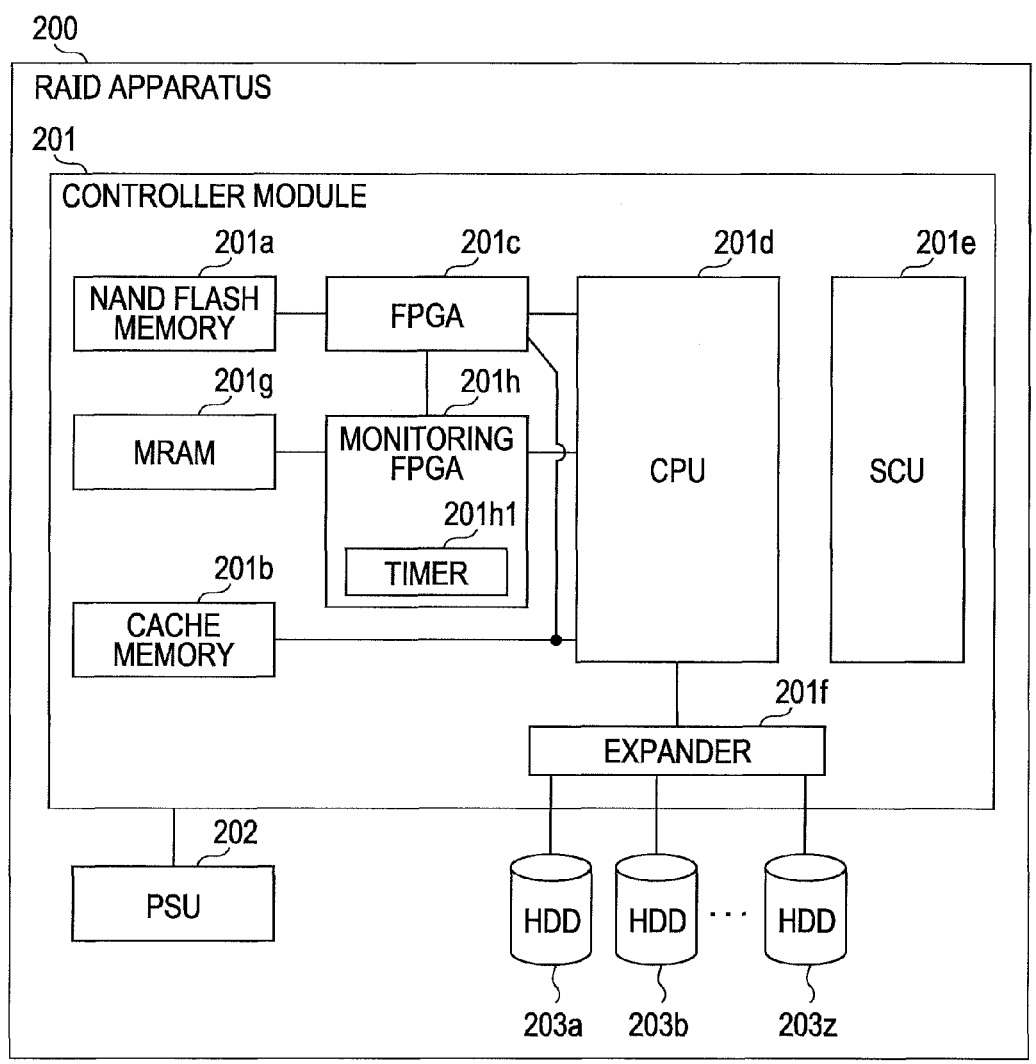
FIG. 1 is a functional block diagram illustrating the configuration of a RAID apparatus according to an embodiment.

Now, a description will be given of a RAID (Redundant Arrays of Independent Disks) apparatus, including a save-processing device, according to the present embodiment. FIG. 1 is a functional block diagram illustrating the configuration of a RAID apparatus according to the present embodiment.

In FIG. 1, in response to a request from multiple high-order apparatuses (e.g., host computers, which are hereinafter simply referred to as "hosts"), a RAID apparatus 200 transmits various types of user data and program data stored on HDDs (hard disk drives) 203$a$ to 203$z$. During power failure, the RAID apparatus 200 also executes processing for saving cache data, stored in a cache memory 201$b$ and used for backup, to a NAND flash memory 201$a$.

The RAID apparatus 200 includes a controller module 201, a PSU (power supply unit) 202, and the HDDs 203$a$ to 203$z$.

The controller module 201 serves as a controller for managing the cache memory 201$b$, controlling interfacing with the hosts, and controlling the HDDs 203$a$ to 203$z$. The controller module 201 is one type of save-processing device. The controller module 201 includes the NAND flash memory 201$a$ (a first nonvolatile memory), the cache memory 201$b$, and an FPGA (field programmable gate array: a first control unit) 201$c$. The controller module 201 further includes a CPU (RAID-on-chip) 201$d$ for controlling the RAID and cache of the RAID apparatus 200 when power is supplied, an SCU (super capacitor unit) 201$e$, and an expander 201$f$. The controller module 201 further includes an MRAM (magnetoresistive random access memory: a second nonvolatile memory) 201$g$ and a monitoring FPGA 201$h$ (a second control unit) for controlling access to the MRAM 201$g$. The monitoring FPGA 201$h$ has a timer 201$h1$. Upon being set by the monitoring FPGA 201$h$, the timer 201$h1$ outputs a time elapsed from the setting.

The NAND flash memory 201$a$ is a NAND-type memory for backing up cache data stored in the cache memory 201$b$ when power failure occurs in the RAID apparatus 200.

The NAND flash memory 201$a$ is accessed for each block and cache data in the cache 201$b$ is written to the NAND flash memory 201$a$ in a sequential-write mode.

Figure 2:
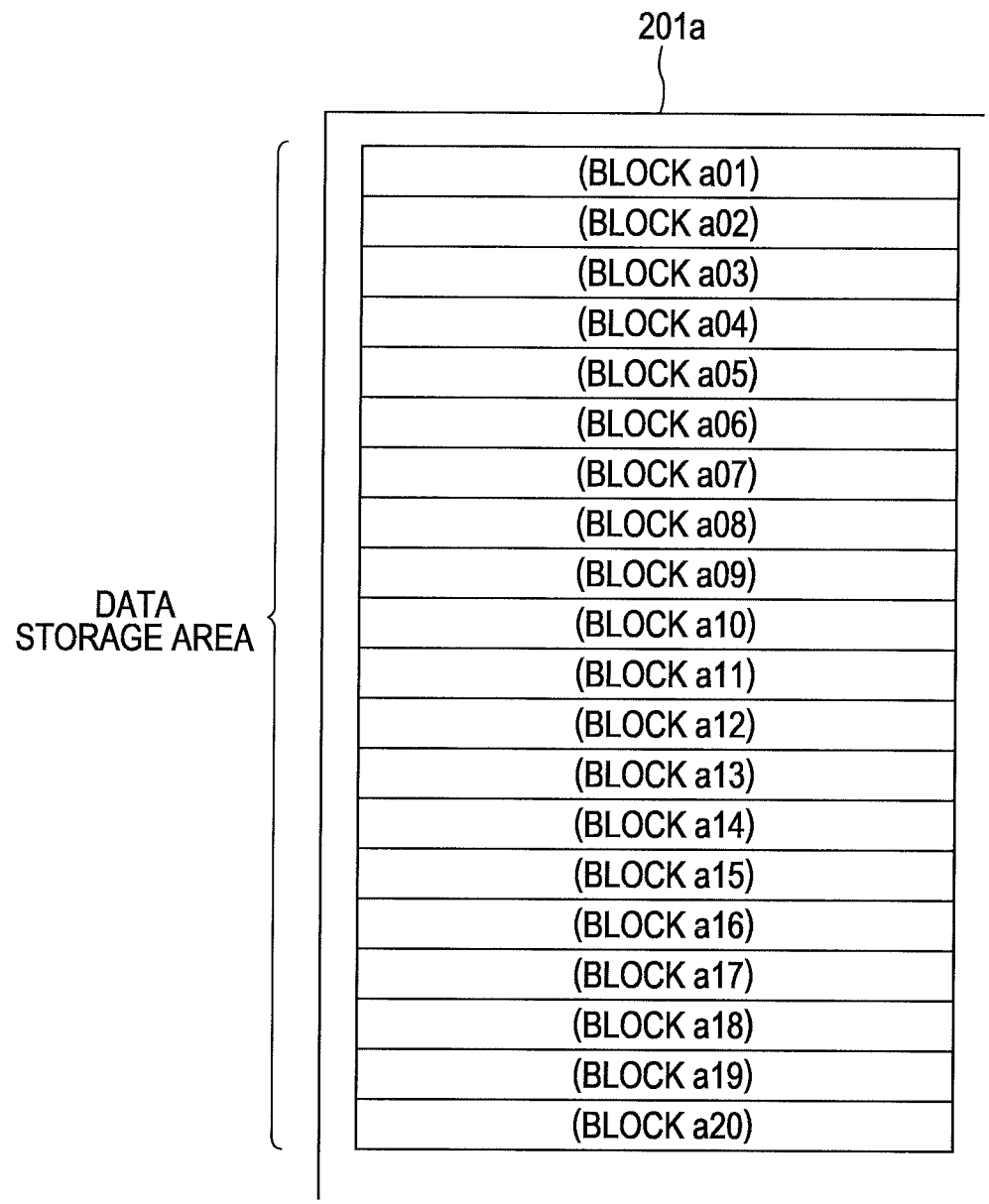
FIG. 2 illustrates one example of the data structure of a NAND flash memory in the present embodiment.

FIG. 2 illustrates one example of the data structure of the NAND flash memory 201$a$ in the present embodiment. The NAND flash memory 201$a$ in FIG. 2 has multiple blocks a01 to a20.

The blocks a01 to a20 are data areas in which cache data are written and stored. The data area per block in the NAND flash memory 201$a$ in the present embodiment may be 4 Mbytes.

The cache memory 201$b$ illustrated in FIG. 1 will be described next. The cache memory 201$b$ temporarily stores user data transferred between the hosts and the HDDs 203$a$ to 203$z$. The user data stored in the cache memory 201$b$ as described above is referred to as "cache data".

Figure 3:
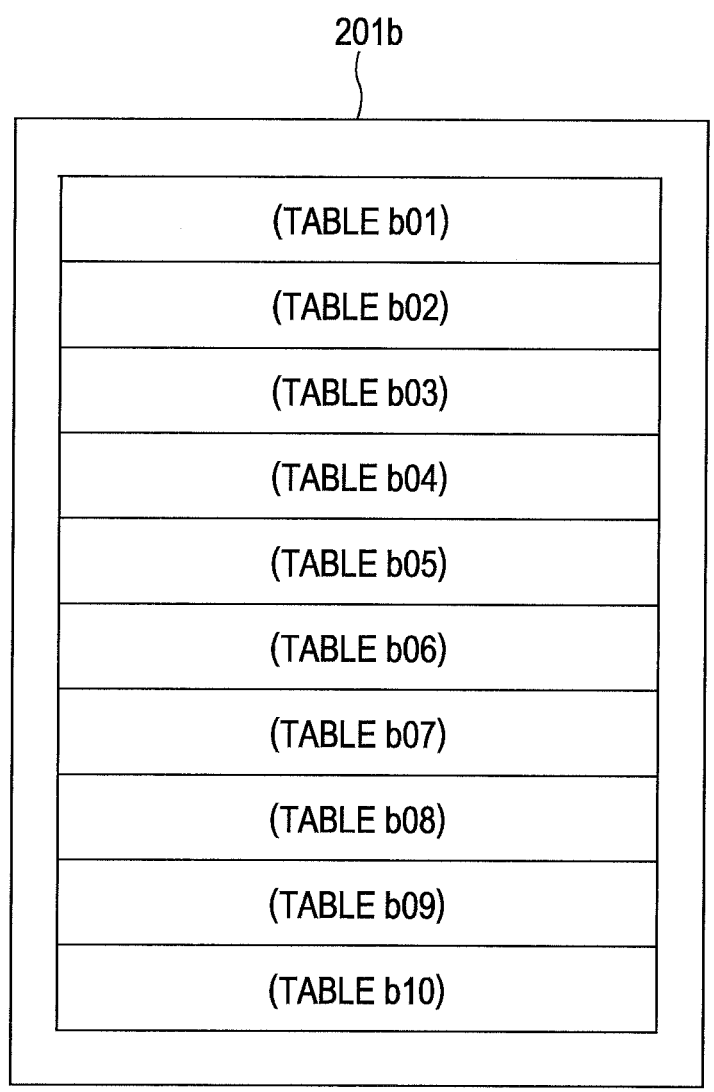
FIG. 3 illustrates one example of the data structure of a cache memory in the present embodiment.

FIG. 3 illustrates one example of the data structure of the cache memory 201$b$ in the present embodiment. The cache memory 201$b$ illustrated in FIG. 3 has multiple tables b01 to b10 for temporarily storing cache data.

Each of the tables b01 to b10 illustrated in FIG. 3 may have a capacity of 4 Mbytes for storing user data. The CPU 201$d$ is assumed to manage the user data in units of 64 kB data length.

Examples of the user data include read data and write data. The term "read data" as used herein refers to user data read from any of the HDDs 203$a$ to 203$z$ and temporarily stored in the cache memory 201$b$.

When the host issues a user-data reading request to the RAID apparatus 200 and the controller module 201 retrieves, from the tables b01 to b10 in the cache memory 201$b$, cache data of user data corresponding to the reading request, the controller module 201 outputs the retrieved cache data to the host.

On the other hand, when the controller module 201 fails to retrieve the cache data from the cache memory 201$b$, the controller module 201 retrieves, from the HDD 203$a$ or the like, user data corresponding to the reading request and copies the retrieved user data to the cache memory 201$b$. Such processing for retrieving, from the HDD 203$a$ or the like, user data corresponding to a reading request is hereinafter referred to as "staging".

As described above, since the read data is data retrieved from the HDD 203$a$ to HDD 203$z$, the read data may be retrieved again from the HDDs 203a to HDD 203z even if the cache data is deleted from the cache memory 201b.

On the other hand, the "write data" is user data that is temporarily stored in the cache memory 201b in response to a writing request issued from the host to the RAID apparatus 200. The write data is written to the HDD(s) after satisfying predetermined conditions. Thus, there is a possibility that the write data is not written to any of the HDDs 203a to 203z.

The FPGA 201c will now be described with reference back to FIG. 1. The FPGA 201c may be an integrated circuit to be controlled by a predetermined program and has a DMA (direct memory access) engine.

The DMA engine has a function used for saving and restoring, during power failure, the cache data in the cache memory 201b to the NAND flash memory 201a without use of the CPU 201d.

Examples of the DMA engine may include a write DMA for saving the cache data, a read DMA for returning saved data to the cache memory 201b, and a command-issuing DMA for erasing and checking the data in the NAND flash memory 201a during power failure. In response to an instruction from the CPU 201d, the DMA engine transfers the data by hardware.

Figure 4:
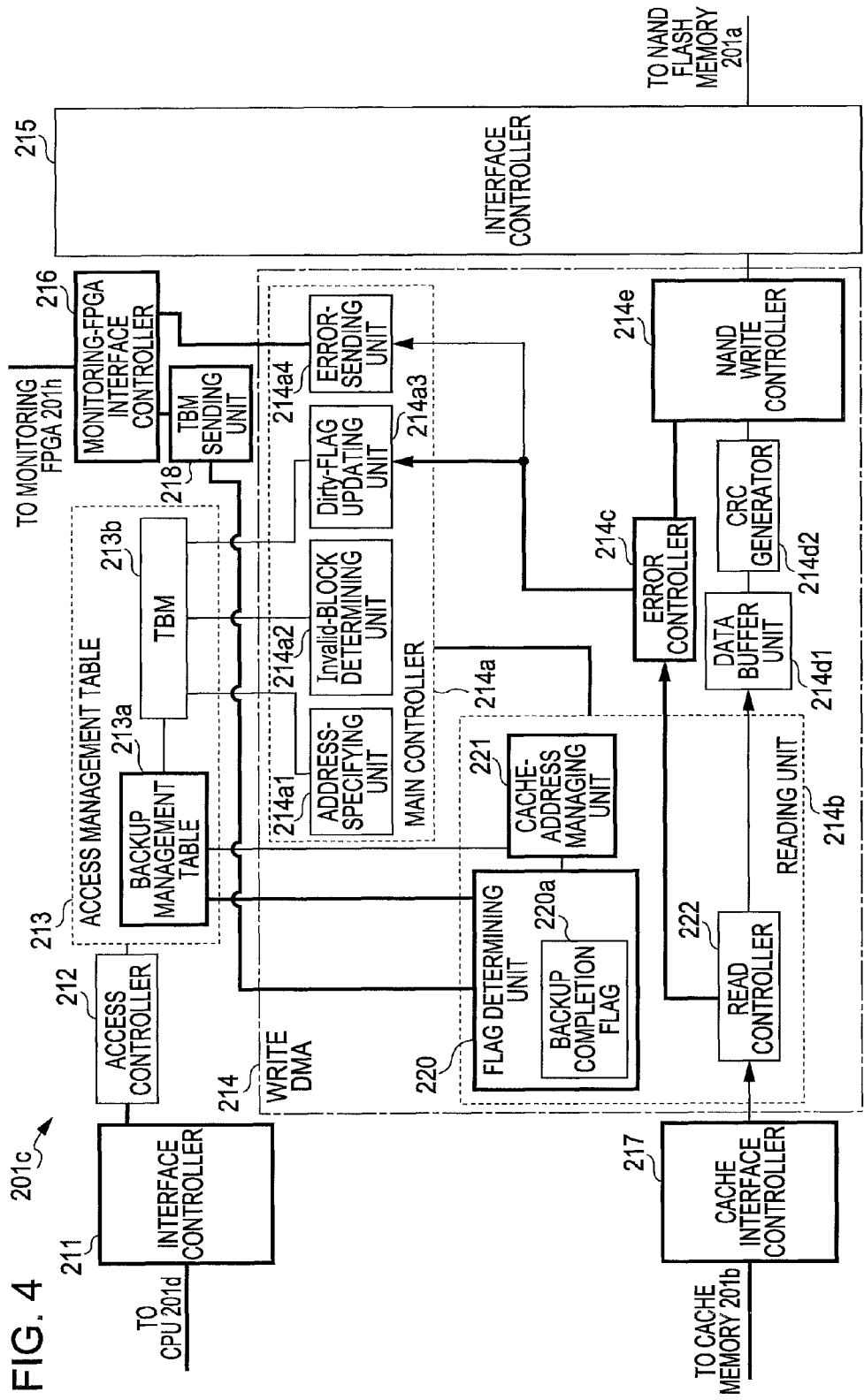
FIG. 4 is a functional block diagram illustrating the configuration of an FPGA in the present embodiment.

The FPGA 201c will now be described with reference to FIG. 4. FIG. 4 is a functional block diagram illustrating the configuration of the FPGA 201c in the present embodiment. During power failure, the FPGA 201c executes processing for saving given data in the cache memory 201b to the NAND flash memory 201a. When power is restored, the FPGA 201c also returns the data, saved to the NAND flash memory 201a during power failure, to the cache memory 201b in accordance with an instruction from the CPU 201d.

The FPGA 201c has an interface controller 211, an access controller 212, an access management table 213, a write DMA 214, an interface controller 215, a monitoring-FPGA interface controller 216 for communicating with the monitoring FPGA 201h, and a cache interface controller 217 for accessing the cache memory 201b.

The interface controller 211 controls exchange of various types of data between the CPU 201d illustrated in FIG. 1 and the write DMA 214 and exchange of various data between the CPU 201d and the access controller 212.

The access controller 212 serves as a controller for controlling exchange of various data between the access management table 213 and the CPU 201d via the interface controller 211.

The access management table 213 has a backup management table 213a and an invalid-block management table (TBM) 213b, which may be implemented as a "TBM (table block module)", for managing invalid blocks. The data structure of the backup management table 213a will be described next.

Figure 5:
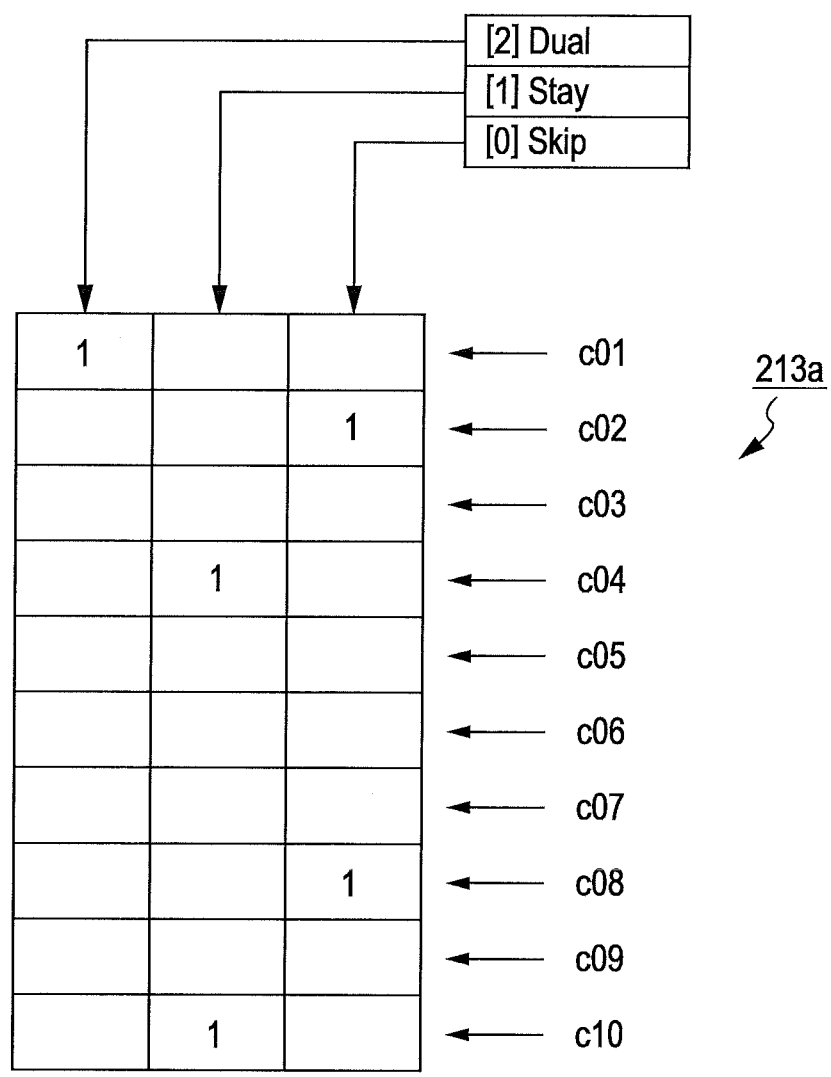
FIG. 5 illustrates one example of the data structure of a backup management table in the present embodiment.

FIG. 5 illustrates one example of the data structure of the backup management table 213a. As illustrated in FIG. 5, the backup management table 213a has multiple 3-bit flags c01 to c10 associated with the respective tables b01 to b10 in the cache memory 201b.

Each 3-bit flag has three bits constituted by a bit [2], a bit [1], and a bit [0], each of which represents a flag for identifying, during power failure, what type of processing is to be performed on data stored in the corresponding table. The meanings of the flags of the bits in the present embodiment will be described next.

The bit [2] of the 3-bit flag indicates whether or not dual writing (Dual) is to be performed. The bit [1] represents a flag indicating priority. The bit [1] at which the flag is set (i.e., "1" is set) indicates lower priority (Stay) than the bit [1] at which the flag is not set. In addition, the bit [0] represents a flag for determining whether or not the backup is to be skipped. When "1" is set for the bit [0], this means that the backup may not be performed.

The CPU 201d manages the backup management table 213a.

Next, a description will be given of the invalid-block management table (TBM) 213b illustrated in FIG. 4. The invalid-block management table (TBM) 213b is a table that manages invalid blocks where failures due to deterioration of the NAND flash memory 201a illustrated in FIG. 2 occurred. Examples of the failures include a writing failure (Program Fail), an erasing failure (Erase Fail), and a reading failure (Read Fail). Firmware of the CPU 201d manages the data in the invalid-block management table (TBM) 213b.

Figure 6:
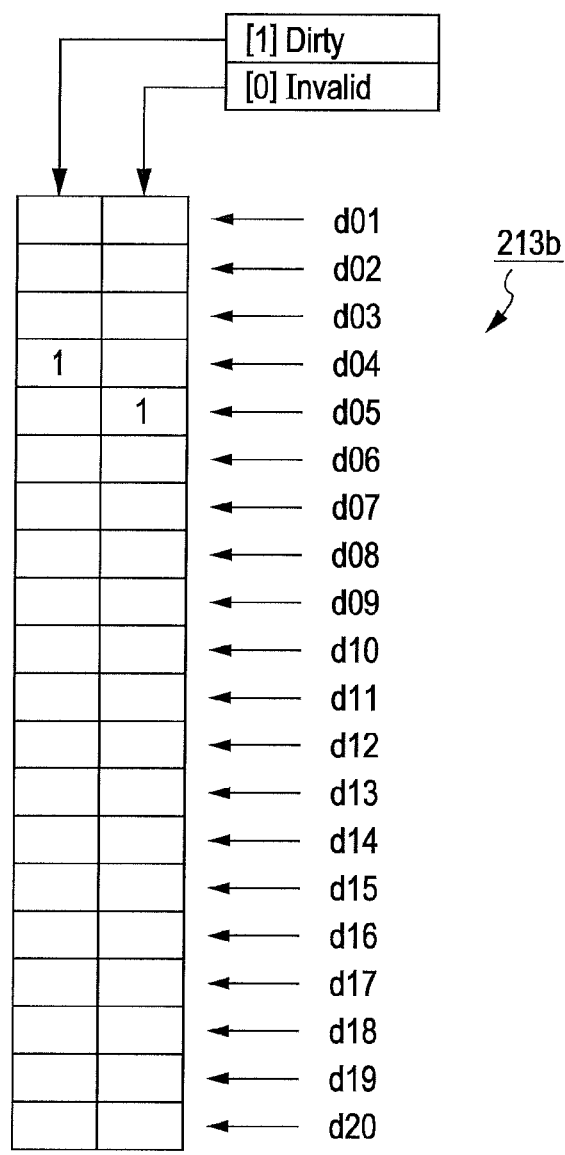
FIG. 6 illustrates one example of the data structure of an invalid-block management table (TBM) in the present embodiment.

A specific example of the data will now be described with reference to FIG. 6. FIG. 6 illustrates one example of the data structure of the invalid-block management table (TBM) 213b in the present embodiment. The invalid-block management table (TBM) 213b in the present embodiment has entries d01 to d20 associated with the respective blocks a01 to a20 in the NAND flash memory 201a. Each entry has a flag for identifying "dirty" or "invalid".

The "dirty" flag indicates that a transfer error of user data occurred during backup and writing to the NAND flash memory 201a is not properly completed.

A flag "1" set as illustrated in FIG. 6 indicates a "dirty" state and a flag "0" indicates a case in which the transfer of user data is properly completed.

The "invalid" flag is a flag indicating that the corresponding block in the NAND flash memory 201a is an invalid block. That is, the "invalid" flag indicates that the block included in the NAND flash memory 201a and associated with the entry in which the flag "1" is included is not usable for backup.

The write DMA 214 will now be described with reference back to FIG. 4. The write DMA 214 serves as a DMA for saving the user data in the cache memory 201b. The write DMA 214 includes a main controller 214a, a reading unit 214b, an error controller 214c, a data buffer unit 214d1, a CRC (cyclic redundancy check) generator 214d2, and a NAND write controller 214e.

The main controller 214a serves as a processor for updating the "invalid" flags and the "dirty" flags stored in the invalid-block management table (TBM) 213b.

The main controller 214a has an address-specifying unit 214a1, an invalid-block determining unit 214a2, a dirty-flag updating unit 214a3, and an error-sending unit 214a4.

The address-specifying unit 214a1 manages addresses in the invalid-block management table (TBM) 213b. On the basis of the "invalid" flag in the entry stored in the invalid-block management table (TBM) 213b, the invalid-block determining unit 214a2 determines whether or not the corresponding block in the NAND flash memory 201a is invalid.

In addition, on the basis of error detection performed by the error controller 214c, the dirty-flag updating unit 214a3 updates the "dirty" flag in the entry in the invalid-block management table (TBM) 213b.

The error-sending unit 214a4 controls the monitoring-FPGA interface controller 216 to send a result of the error detection, performed by the error controller 214c, to the monitoring FPGA 201h.

During power failure, the main controller 214a performs control for requesting the reading unit 214b to start reading the data in the cache memory 201b.

The reading unit 214b serves as a controller for saving at least part of the data in the cache memory 201b to the NAND flash memory 201a during power failure.

The reading unit 214b has a flag determining unit 220, a cache-address managing unit 221, and a read controller 222.

Figure 7:
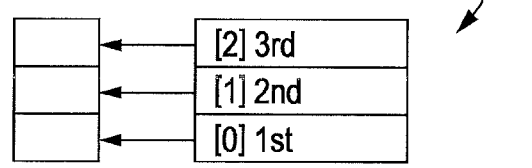
FIG. 7 illustrates one example of the data structure of a backup-completion flag in the present embodiment.

As illustrated in FIG. 4, the flag determining unit 220 has a backup completion flag 220a. As illustrated in FIG. 7, the backup completion flag 220a is constituted by 3 bits, i.e., bits [0], [1], and [2].

The bits represent flags indicating whether corresponding first to third backup processing described below has been completed.

During power failure, the flag determining unit 220 instructs the read controller 222 to perform three different types of data reading.

The first backup processing is processing for backing up data in the blocks included in the cache memory 201b and associated with, in the backup management table 213a, the 3-bit flags whose bits [1] (Stay) and bits [0] (Skip) indicate "0". That is, the first backup processing is processing for saving, to the NAND flash memory 201a, the data in the blocks in the cache memory 201b which are not low in the priority and are not to be skipped.

The second backup processing is processing for backing up data in the blocks included in the cache memory 201b and associated with, in the backup management table 213a, the 3-bit flags whose bits [1] (Stay) indicate "1". That is, the second backup processing is processing for saving the data in the blocks in the cache memory 201b to the NAND flash memory 201a.

The third backup processing is processing for backing up data in the blocks included in the cache memory 201b and associated with, in the backup management table 213a, the 3-bit flags whose bits [2] (Dual) indicate "1". Since the data backed up in the third backup processing is the data already saved to the NAND flash memory 201a in the first backup processing, the same data is written twice.

When a TBM sending unit 218 detects that the flag "[2] 3rd" becomes "1" during writing of the backup completion flag 220a in the flag determining unit 220, the TBM sending unit 218 controls the monitoring-FPGA interface controller 216 to send, to the monitoring FPGA 201h, the data in the invalid-block management table (TBM) 213b and information indicating completion of the backup.

The cache-address managing unit 221 serves as a processor that manages cache addresses indicating the positions of cache data in the cache memory 201b and that outputs the managed cache addresses to the flag determining unit 220.

Using the cache interface controller 217 for performing communication with the cache memory 201b, the read controller 222 reads the cache data in the table stored in the cache memory 201b and specified by the flag determining unit 220. The read data is output to the error controller 214c and the data buffer unit 214d1.

When a transfer error occurs in one NAND block, the error controller 214c sends, to the main controller 214a, a notification indicating the address for identifying the NAND block. Upon receiving the notification, the dirty-flag updating unit 214a3 in the main controller 214a issues a request for updating the "dirty" flag in the invalid-block management table (TBM) 213b.

In order to inhibit corruption of the cache data input from the read controller 222, the data buffer unit 214d1 performs an XOR (exclusive OR) operation to generate XOR parity data and adds the XOR parity data to the cache data.

The CRC generator 214d2 has a buffer. The CRC generator 214d2 adds redundant bits including a CRC (cyclical redundancy check) and an AID (area ID) to the user data, holds the resulting user data in the buffer, and outputs the user data stored in the buffer to the NAND write controller 214e.

The NAND write controller 214e has addresses for identifying the respective blocks in the NAND flash memory 201a. The NAND write controller 214e outputs the user data, input from the CRC generator 214d2, to the NAND flash memory 201a via the interface controller 215 and writes the user data to the NAND flash memory 201a.

In addition, during writing of the cache data to the NAND flash memory 201a, when a transfer error occurs to cause a writing failure, the NAND write controller 214e outputs identification data of the corresponding block to the error controller 214c.

The interface controller 215 serves as an interface for controlling exchange of various types of data between the write DMA 214 and the NAND flash memory 201a.

The SCU (super capacitor unit) 201e illustrated in FIG. 1 will be briefly described below. The SCU 201e includes a large-capacity capacitor, such as an electrolytic capacitor. When power failure occurs in the RAID apparatus 200, the SCU 201e supplies power to the controller module 201 without external power supply. The SCU 201e stores electric power by using power that a power-supply device (not illustrated) supplies to the controller module 201. During power failure, the SCU 201e discharges the stored electric power to thereby supply power to the controller module 201. Since the SCU 201e is implemented by a large-capacity capacitor as described above, it is possible to temporarily supply power but it is difficult to perform long-term continuous power supply. It is assumed that, in the present embodiment, power may be supplied only for, for example, about 40 seconds.

The expander 201f serves as a processor for relaying user data transmitted/received between the CPU 201d and the HDDs 203a to 203z.

The PSU (power supply unit) 202 serves a device for externally supplying power to the RAID apparatus 200. When the external power supply is stopped, i.e., when power failure occurs, the power supply to the RAID apparatus 200 is stopped. During the power failure, the SCU 201e discharges electric power to thereby supply power to the RAID apparatus 200.

The HDDs 203a to 203z constitute a RAID group and have storage media (disks) and so on for writing user data and storing programs. Data are allocated to the HDDs 203a to 203z in accordance with the levels of access speed and data security.

The monitoring FPGA 201h writes/reads data to/from the MRAM 201g and may directly communicate with the FPGA 201c and the CPU 201d. In response to an instruction from the FPGA 201c or the CPU 201d, the monitoring FPGA 201h accesses the MRAM 201g. The monitoring FPGA 201h has the timer 201h1, as described above.

The MRAM 201g is one type of nonvolatile memory and generally has high reliability compared to NAND flash memories.

The structure of the MRAM 201g will now be described with reference to FIG. 8.

Figure 8:
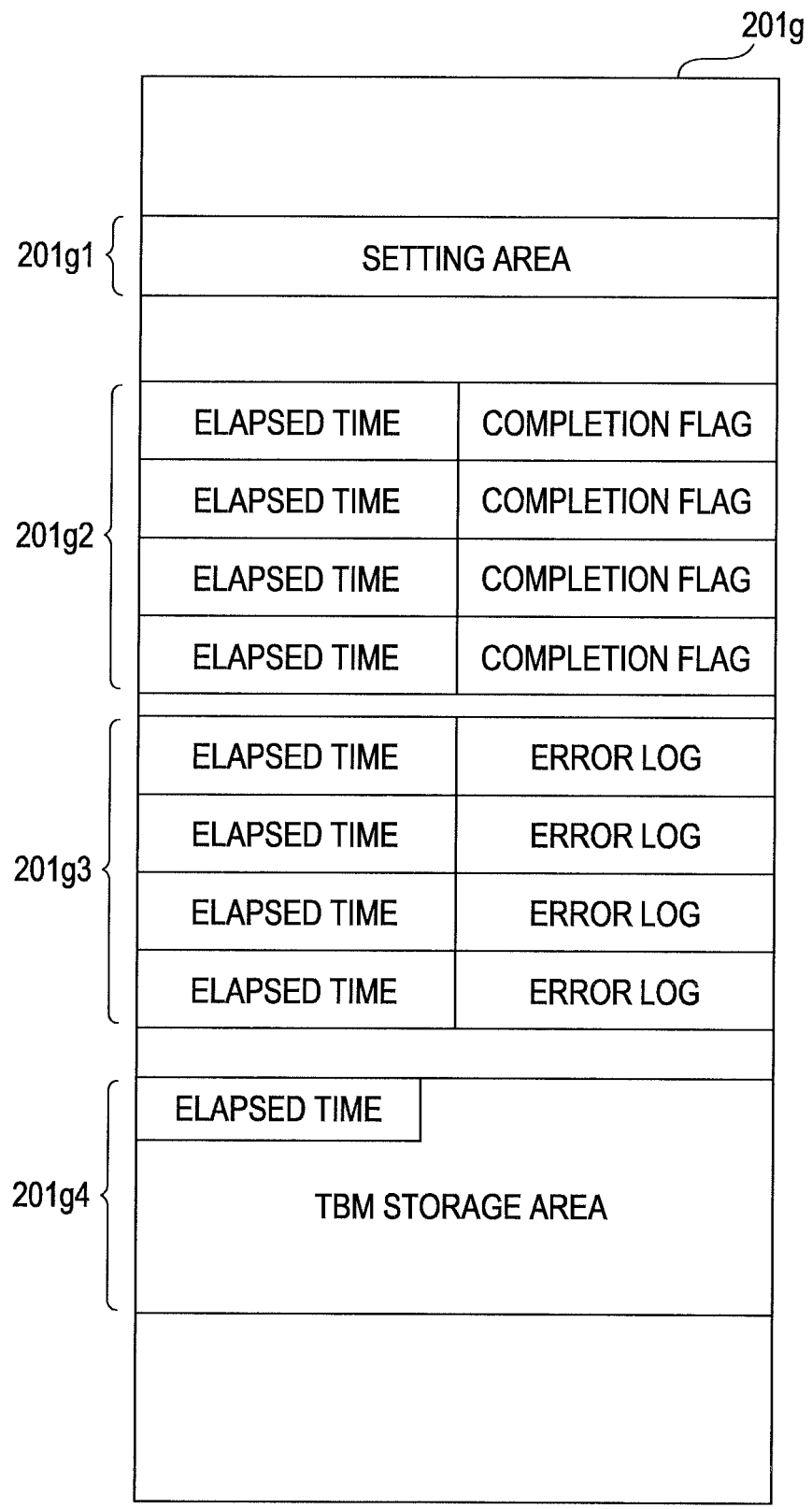
FIG. 8 illustrates a storage area of an MRAM in the present embodiment.

As illustrated in FIG. 8, the MRAM 201g has four storage areas, specifically, a setting area 201g1, a completion-flag storage area 201g2, an error-log storage area 201g3, and a TBM storage area 201g4.

The completion-flag storage area 201g2 stores completion flags and corresponding elapsed times (described below) when the completion flags are stored.

The error-log storage area 201g3 also stores elapsed times in conjunction with corresponding error logs. The TBM storage area 201g4 stores data of the invalid-block management table (TBM) 213b and the elapsed time in association with each other. Storage of those elapsed times and data is performed by the monitoring FPGA 201h.

Figure 9:
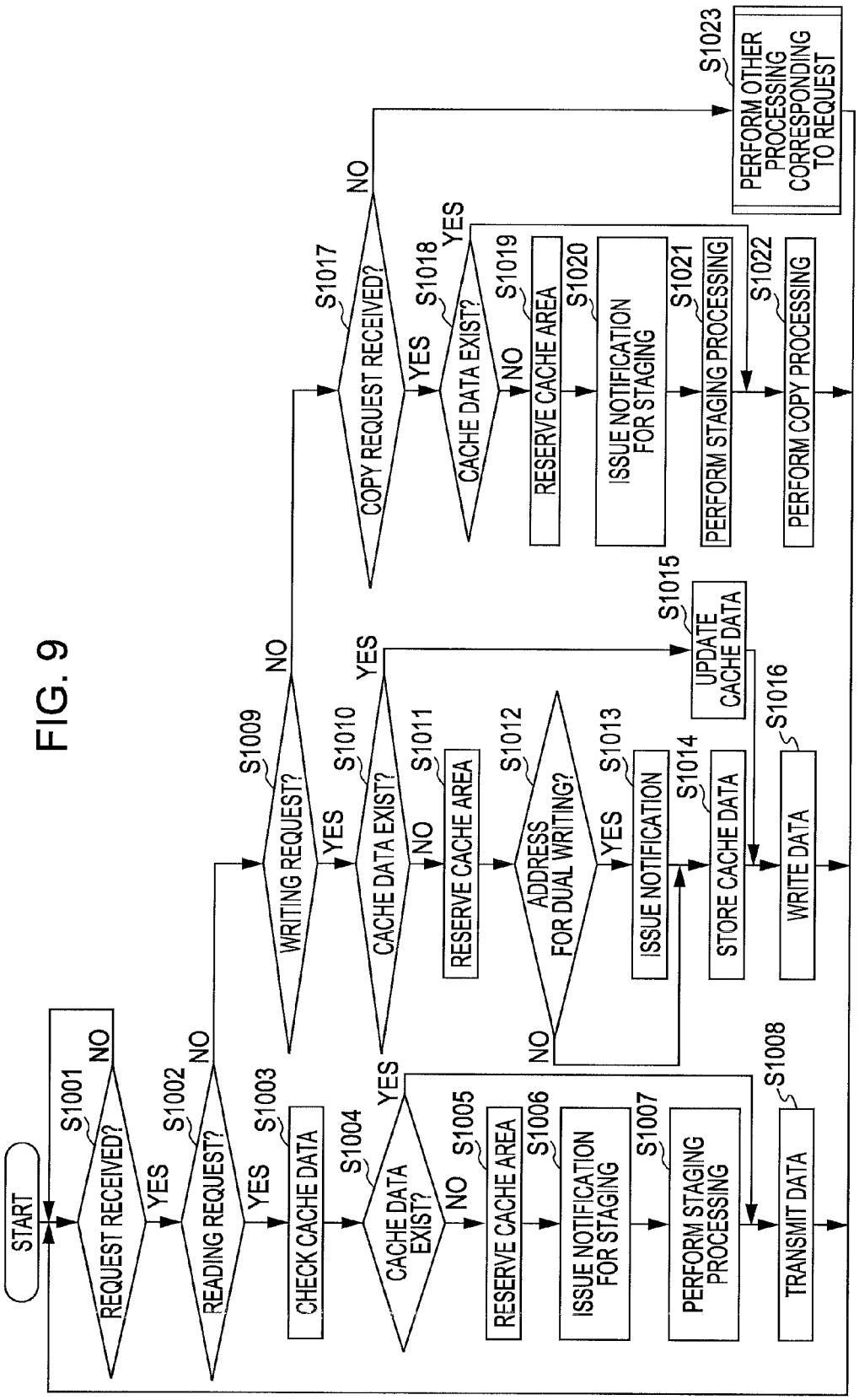
FIG. 9 is a flowchart illustrating processing of a save-processing device of the present embodiment when power is supplied.

Processing performed when power is supplied to the RAID apparatus of the present embodiment will now be described with reference to FIG. 9.

First, in step S1001, the CPU 201d in the RAID apparatus 200 of the present embodiment receives a request from the host (not illustrated). In step S1002, the CPU 201d determines whether or not the contents of the request indicate a reading request.

When it is determined in step S1002 that the request received from the host is a reading request, the CPU 201d obtains a disk address that is contained in the reading request received from the host and that indicates an access position in the HDDs 203a to 203z. In step S1003, the CPU 201d searches the tables b01 to b10 in the cache memory 201b to determine whether or not data corresponding to the disk address is stored in any of the tables b01 to b10.

When the data requested by the host is retrieved from any of the tables b01 to b10 in the cache memory 201b (i.e., Yes in step S1004), the proceeds to step S1008 in which the CPU 201d transmits the retrieved data to the host.

On the other hand, when the data requested by the host is not retrieved from the cache memory 201b (i.e., No in step S1004), the process proceeds to step S1005 in which the CPU 201d reserves, in the cache memory 201b, a table for storing data at the disk address contained in the request received from the host. More specifically, when an available table (a table in which no cache data is included) having a capacity that is large enough to store data at the disk address included in the request exists in the tables b01 to b10 in the cache memory 201b, the CPU 201d reserves the available table. When no available table exists, the CPU 201d creates and reserves an available table by clearing, of the cache data stored in the tables b01 to b10, data whose storage time is long. When the data in the table is cleared, all bits of the 3-bit flag included in the backup management table 213a and associated with that table are updated to "0".

In step S1006, the CPU 201d issues a notification regarding the reserved table, which is to be used for the above-described "staging", to the FPGA 201c. Upon receiving the notification, the main controller 214a in the FPGA 201c controls the cache-address managing unit 221 to update the bit [0], i.e., the "Skip" flag, of the 3-bit flag included in the backup management table 213a and associated with the reserved table, to "1".

Thereafter, in step S1007, the CPU 201d performs staging processing.

In the staging processing, specifically, the CPU 201d first retrieves data, stored at the disk address included in the reading request, from the HDDs 203a to 203z via the expander 201f. The CPU 201d then copies the retrieved data to the reserved area in the cache memory 201b to thereby execute the staging processing.

In step S1008, the CPU 201d transmits the retrieved data to the host, and the process returns to step S1001.

When it is determined in the reading-request determination processing in step S1002 that the request received from the host is not a reading request (i.e., No in step S1002), the process proceeds to step S1009 in which the CPU 201d determines whether or not the received request is a writing request.

When it is determined that the received request is a writing request (i.e., Yes in step S1009), the process proceeds to step S1010 in which the CPU 201d checks whether or not data is stored at, in the cache memory 201b, the address that is the same as the address included in the writing request.

When it is determined that no cache data is stored at the same address (i.e., No in step S1010), the process proceeds to step S1011 in which the CPU 201d performs processing for reserving a cache area in the cache memory 201b. Since this processing is analogous to the processing in step S1005 described above, a description thereof is not given hereinafter.

In step S1012, the CPU 201d checks whether or not the writing request is for writing data to a specific area in which configuration information or the like is stored. When it is determined in this checking that the writing request is for writing data to a specific area, the process proceeds to step S1013 in which the CPU 201d issues a notification to the FPGA 201c. Upon receiving the notification, the main controller 214a in the FPGA 201c controls the cache-address managing unit 221 to update the flag of the bit [2] (Dual) of the 3-bit flag, included in the backup management table 213a and associated with the table reserved as the cache area, to "1".

In step S1014, the CPU 201d stores data, sent from the host subsequently to the writing request, into the table reserved in the cache memory 201b as the cache area.

In step S1016, the CPU 201d controls the expander 201f to write the data, sent from the host subsequently to the writing request, to the disk address included in the HDDs 203a to 203z and included in the writing request.

When it is determined in the processing in step S1010 that the data stored at the disk address included in the writing request is already stored in the cache memory 201b, the process proceeds to step S1015. In step S1015, the CPU 201d updates the data, stored in the cache memory 201b, with the data sent from the host subsequently to the writing request. Thereafter, the process proceeds to step S1016.

When the CPU 201d completes the processing in step S1016, the process returns to step S1001.

When it is determined in the processing in step S1009 that the received request is not a writing request, the process proceeds to step S1017 in which the CPU 201d determines whether or not the received request is a copy request.

In this case, upon determining that the received request is not a copy request (i.e., No in step S1017), the process proceeds to step S1023 in which the CPU 201d performs other processing corresponding to the request. Thereafter, the process returns to step S1001.

When the CPU 201d determines that the received request is a copy request (i.e., Yes in step S1017), the process proceeds to step S1018 in which the CPU 201d checks whether or not data to be copied is stored in any of the tables b01 to b10 in the cache memory 201b.

When data to be copied is not stored in any of the tables b01 to b10 in the cache memory 201b (i.e., No in step S1018), the process proceeds to step S1019 in which the CPU 201d performs processing for reserving a cache area in the cache memory 201b. Since this processing is analogous to the processing in step S1005 described above, a description thereof is not given hereinafter.

In step S1020, the CPU 201d issues a notification regarding the reserved area, which is to be used for the "staging", to the FPGA 201c. Upon receiving the notification, the main controller 214a in the FPGA 201c controls the cache-address managing unit 221 to update the flag of the bit [1] (Stay) of the 3-bit flag, contained in the backup management table 213a and associated with the table reserved as the cache area, to "1".

Next, in step S1021, the CPU 201d controls the expander 203 to read, from the copy-source HDD, data that is specified by the copy request and is to be copied, and writes the read data to the table included in the cache memory 201b and reserved as the cache area.

In step S1022, the CPU 201d controls the expander 203 to perform copy processing by writing, to the copy-destination HDD, the data that is written in the cache memory 201b and that is to be copied.

When it is determined in step S1018 that the data to be copied is stored in any of the tables b01 to b10 in the cache memory 201b, the CPU 201d does not perform the processing (in steps S1019 to S1021) for the staging and the process proceeds to step S1022 described above.

When the CPU 201d completes the processing in step S1022, the process returns to step S1001. As a result of the above-described processing of the CPU 201d and the FPGA 201c, the 3-bit flags c01 to c10 in the backup management table 213a have statuses as described below.

First, "1" is set for the bit [2] (Dual) included in the backup management table 213a and associated with, in the cache memory 201b, the table for an important area in which configuration information or the like is stored. That is, the data stored in the table is subjected to dual writing at the time of backup during power failure.

Also, "1" is set for the bit [1] (Stay) included in the backup management table 213a and associated with, in the cache memory 201b, the table on which the staging was performed based on the copy instruction. When the copy is to be redone, the load of the HDD in which data to be copied is stored may be reduced when the data is stored in the cache memory 201b. It is, therefore, preferable that the data to be copied be stored in the cache memory 201b. Furthermore, in the case of the copy instruction, since data to be copied exists in any of the HDDs 203a to 203z, loss of the data does not occur. Thus, the priority of the data to be copied is set lower than the priority of data in other areas.

In addition, "1" is set for the bit [0] (Skip) included in the backup management table 213a and associated with, in the cache memory 201b, the table on which the staging was performed based on the reading instruction. Since the data corresponding to the reading instruction is stored in any of the HDDs 203a to 203z, loss of the data does not occur. In addition, in the case of the reading instruction, the same reading instruction is not repeatedly issued immediately after power is restored, unlike the copy instruction, and the data retrieved in response to the reading instruction is not stored in the cache memory 201b. Consequently, the possibility of an increase in the load when power is restored is also low.

Thus, in the present embodiment, the data for which the reading instruction is issued is low in the backup necessity, and is thus skipped, i.e., is not backed up.

As a result of the processing of the CPU 201d, the 3-bit flags whose all bits indicate "0" in the backup management table 213a indicate that data based on the writing instruction is cached. The data based on the writing instruction is data received from the host, and thus may include data that has not been stored on any of the HDDs 203a to 203z yet, depending on the timing of power failure. Hence, during power failure, it is preferable that the data based on the writing instruction be backed up with higher priority than data already stored on the HDDs 203a to 203z.

Accordingly, in the processing (described below) during power failure, the data based on the writing instruction is backed up to the NAND flash memory 201a in conjunction with specific information, such as configuration information, to be subjected to the dual backup.

Processing performed by the RAID apparatus 200 during power failure by using the cache memory 201b, the backup management table 213a, the invalid-block management table (TBM) 213b, the NAND flash memory 201a, and the monitoring FPGA 201h described above will now be described with reference to FIGS. 10 to 18.

Figure 10:
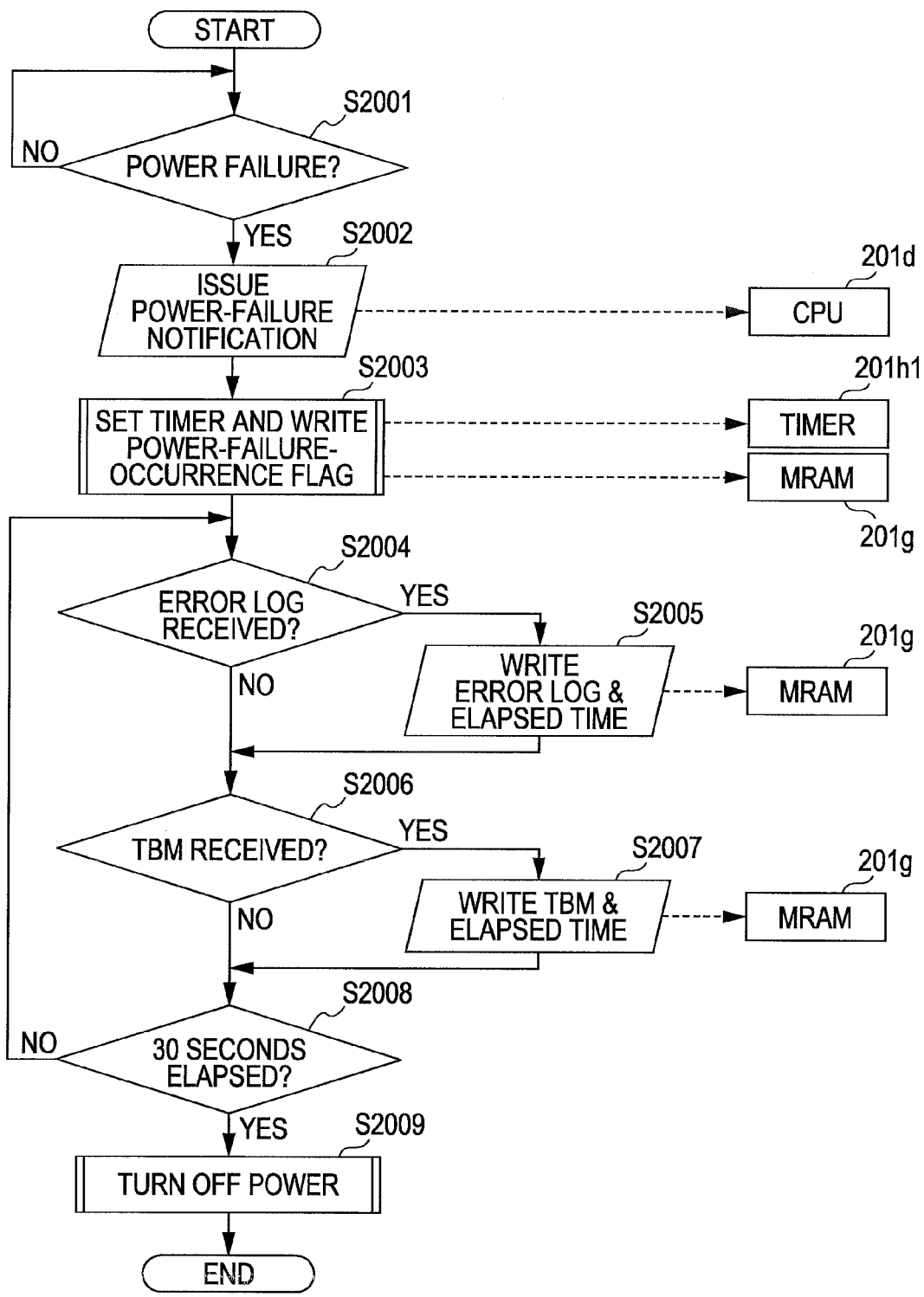
FIG. 10 is a flowchart illustrating processing of a monitoring FPGA in the save-processing device of the present embodiment.

The processing of the monitoring FPGA 201h will first be described with reference to FIG. 10.

The monitoring FPGA 201h has a function for detecting stoppage of the external power supply.

Upon detecting stoppage of the external power supply (i.e., power failure) in step S2001, the monitoring FPGA 201h issues a power-failure notification to the CPU 201d in step S2002.

In step S2003, the monitoring FPGA 201h sets the timer 201h1 and writes a power-failure-occurrence flag to the MRAM 201g. As described above, the timer 201h1 is adapted to output a time elapsed after the setting thereof.

In step S2004, the monitoring FPGA 201h checks whether or not an error log is received from the FPGA 201c.

When an error log is received from the FPGA 201c, the process proceeds to S2005 in which the monitoring FPGA 201h writes the received error log and the output value (i.e., the elapsed time) of the timer 201h1 to the error-log storage area 201g3 in the MRAM 201g.

When the writing is completed or when it is determined in the processing in step S2004 that no error log is received from the FPGA 201c, the process proceeds to step S2006 in which the monitoring FPGA 201h checks whether or not the invalid-block management table (TBM) 213b is received from the FPGA 201c.

When it is determined that the invalid-block management table (TBM) 213b is received, the process proceeds to step S2007 in which the monitoring FPGA 201h writes the received invalid-block management table (TBM) 213b and the output value (i.e., the elapsed time) of the timer 201h1 to the MRAM 201g.

When the writing is completed or when it is determined in the processing in step S2006 that the invalid-block management table (TBM) 213b is not received from the FPGA 201c, the process proceeds to step S2008 in which the monitoring FPGA 201h checks whether or not the output value of the timer 201h1 indicates that 30 seconds or more has elapsed.

When the monitoring FPGA 201h determines that 30 seconds has not elapsed, the process returns to step S2004.

In addition, when it is determined that 30 seconds has elapsed, the process proceeds to step S2009 in which the monitoring FPGA 201h performs processing for turning off the power of the controller module 201. Thereafter, the processing ends.

The processing of the CPU 201d will now be described with reference to FIG. 11.

Figure 11:
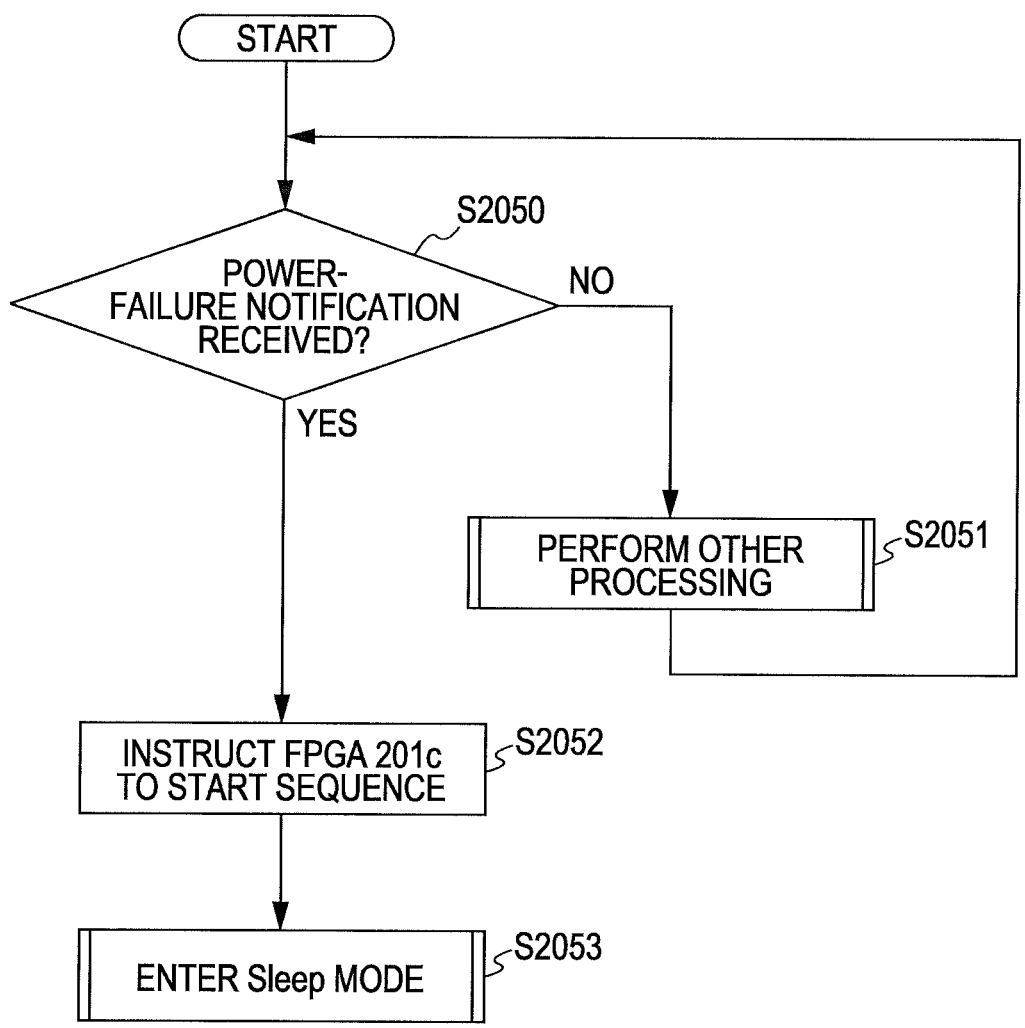
FIG. 11 is a flowchart illustrating processing of a CPU in the save-processing device of the present embodiment when power failure occurs.

Through steps S2050 and S2051 in FIG. 11, the CPU 201d determines whether or not a power-failure notification is received from the monitoring FPGA 201h, in parallel with other processing.

When it is determined in step S2050 that a power-failure notification is received from the monitoring FPGA 201h, the process proceeds to step S2052 in which the CPU 201d instructs the FPGA 201c so as to start a sequence of power-failure processing. Subsequently, in step S2053, the CPU 201d enters a sleep mode.

As described above, the CPU 201d performs RAID control involving the management of the cache memory 201b in the RAID apparatus 200 during power failure, and, upon receiving the power-failure notification from the monitoring FPGA 201h, the CPU 201d merely issues an instruction for starting the sequence of the power-failure processing to the FPGA 201c without performing substantial save processing. In the present embodiment, the save processing is performed by the FPGA 201c and the monitoring FPGA 201h.

With this arrangement, during power failure, processing for saving data in the cache memory 201b is performed without use of the CPU 201d having large power consumption, to thereby reduce the overall power consumed by the RAID apparatus 200. This makes it possible to achieve long-term use of the electric power stored in the SCU 201e.

States of the cache memory 201b, the backup management table 213a, the NAND flash memory 201a, the invalid-block management table (TBM) 213b, and the backup completion flag 220a immediately before power failure occurs, in the present embodiment, will now be briefly described with reference to FIG. 12.

Figure 12:
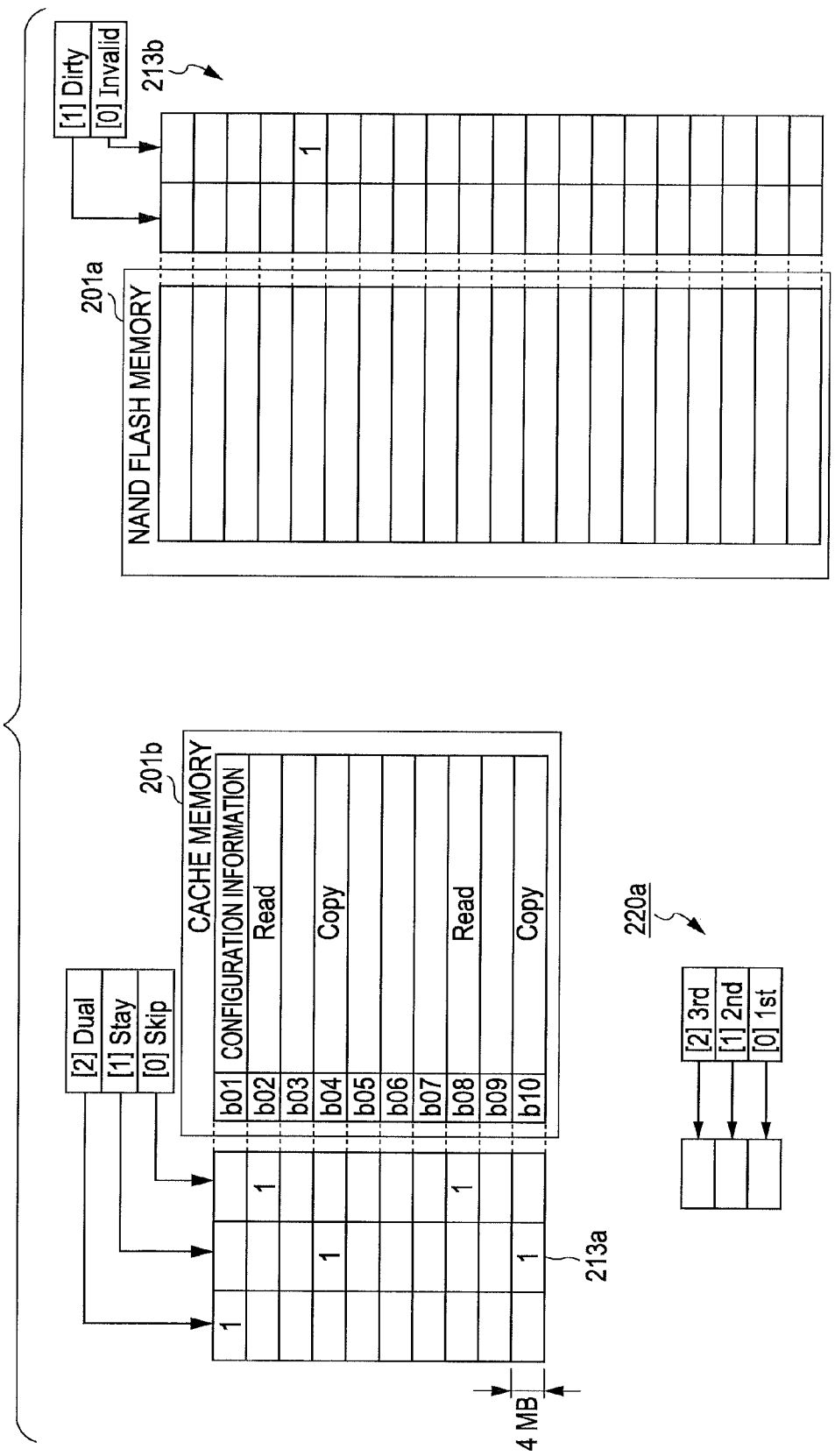
FIG. 12 illustrates processing of the save-processing device of the present embodiment when power failure occurs.

The states illustrated in FIG. 12 are merely exemplary, and the contents of data stored in the cache memory 201b are updated as appropriate when power is supplied and thus the states immediately after power failure may be different from the states illustrated in FIG. 12.

In the above-described processing, the contents of the 3-bit flags c01 to c10 in the backup management table 213a are determined according to the types of data stored in the corresponding tables b01 to b10 in the cache memory 201b.

In the present embodiment, as illustrated in FIG. 12, configuration information is included in the table b01 in the cache memory 201b. Thus, "1" is set at the bit [2] (Dual) of the corresponding 3-bit flag c01.

Also, "1" is set for the flags (Stay) at the bits [1] of the 3-bit flags c04 and c10 corresponding to the data retrieved based on the copy instruction and stored in the tables b04 and b10.

In addition, "1" is set for the flags (Skip) at the bits [0] of the 3-bit flags c02 and c08 corresponding to the data retrieved based on the reading instruction and stored in the tables b02 and b08.

Also, "1" is set for the "invalid" flag in the entry d05 in the invalid-block management table (TBM) 213b for the NAND flash memory 201a. The flag "1" indicates that the block a05 included in the NAND flash memory 201a and associated with the entry d05 is an invalid block.

Figure 13:
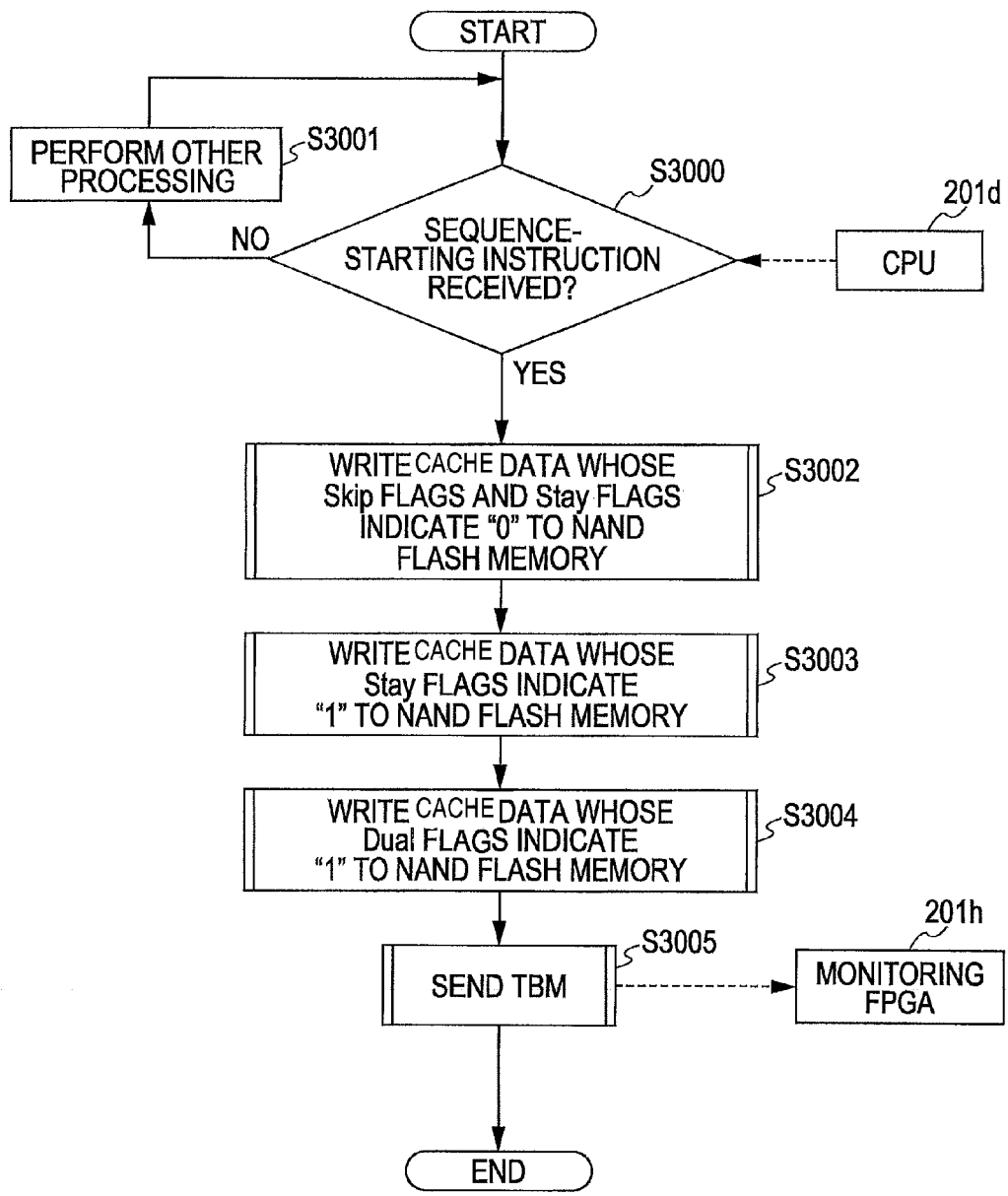
FIG. 13 is a flowchart illustrating processing of the save-processing device of the present embodiment when power failure occurs.

Processing of the FPGA 201c in this state will be described below with reference to FIG. 13.

As described above, upon detecting a power failure, the monitoring FPGA 201h sends a power-failure notification to the CPU 201d, and in response to the power-failure notification, the CPU 201d issues, to the FPGA 201c, an instruction for starting the sequence of the power-failure processing.

In steps S3000 and S3001, the FPGA 201c determines whether or not the instruction for starting the sequence of the power-failure processing is received, in parallel with other processing.

In step S3002, the FPGA 201c performs processing for writing, to the NAND flash memory 201a, data in areas included in the cache memory 201b and associated with, of the 3-bit flags c01 to c10 in the backup management table 213a, the 3-bit flags whose both bits [1] (Stay) and bits [0] (Skip) indicate "0".

Next, in step S3003, the main controller 214a controls the read controller 222 to perform processing for writing, to the NAND flash memory 201a, data in areas included in the cache memory 201b and associated with, of the 3-bit flags c01 to c10 in the backup management table 213a, the 3-bit flags whose bits [1] (Stay) indicate "1".

Additionally, in step S3004, the FPGA 201c performs processing for writing, to the NAND flash memory 201a, data in areas included in the cache memory 201b and associated with, of the 3-bit flags c01 to c10 in the backup management table 213a, the 3-bit flags whose bits [2] (Dual) indicate "1".

Upon completion of the writing processing, the process proceeds to step S3005 in which the FPGA 201c sends the data in the invalid-block management table (TBM) 213b to the monitoring FPGA 201h. Thereafter, the processing ends.

In steps S3002, S3003, and S3004 described above, substantially the same processing is performed except that the data areas in the cache memory 201b are different.

Figure 14:
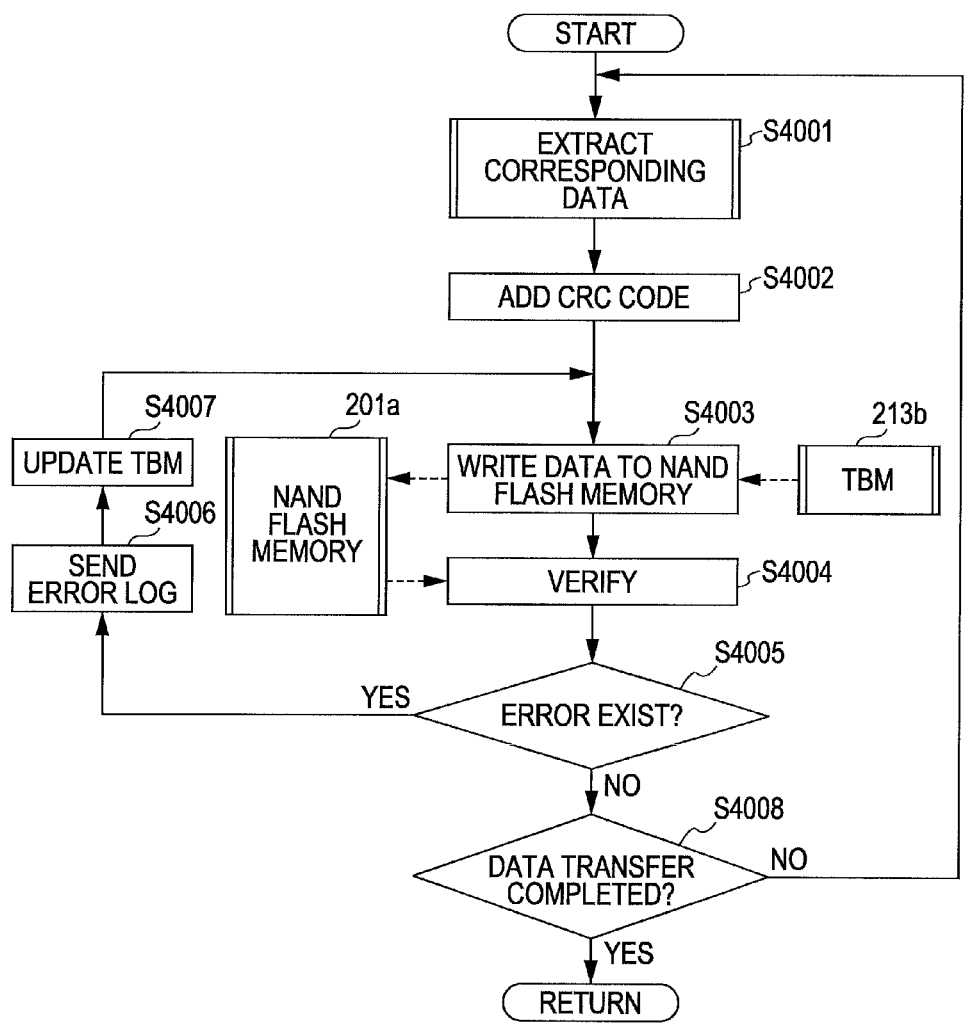
FIG. 14 is a flowchart illustrating processing of the save-processing device of the present embodiment when power failure occurs.

This processing will be described next with reference to FIG. 14.

First, in step S4001, the main controller 214a in the FPGA 201c causes the read controller 222 to refer to the 3-bit flags c01 to c10 in the backup management table 213a to read corresponding data in the cache memory 201b. For example, in the processing in step S3002 in FIG. 13, the FPGA 201c causes the read controller 222 to read data stored in the cache memory 201b and associated with, in the backup management table 213a, the 3-bit flags whose neither bits [1] (Stay) nor bits [0] (Skip) indicate "1".

In the example of FIG. 12, since the 3-bit flags c01, c03, c05, c06, c07, and c09 in the backup management table 213a correspond to those 3-bit flags, the read controller 222 reads the data in the tables b01, b03, b05, b06, b07, and b09 in the cache memory 201b.

Figure 15:
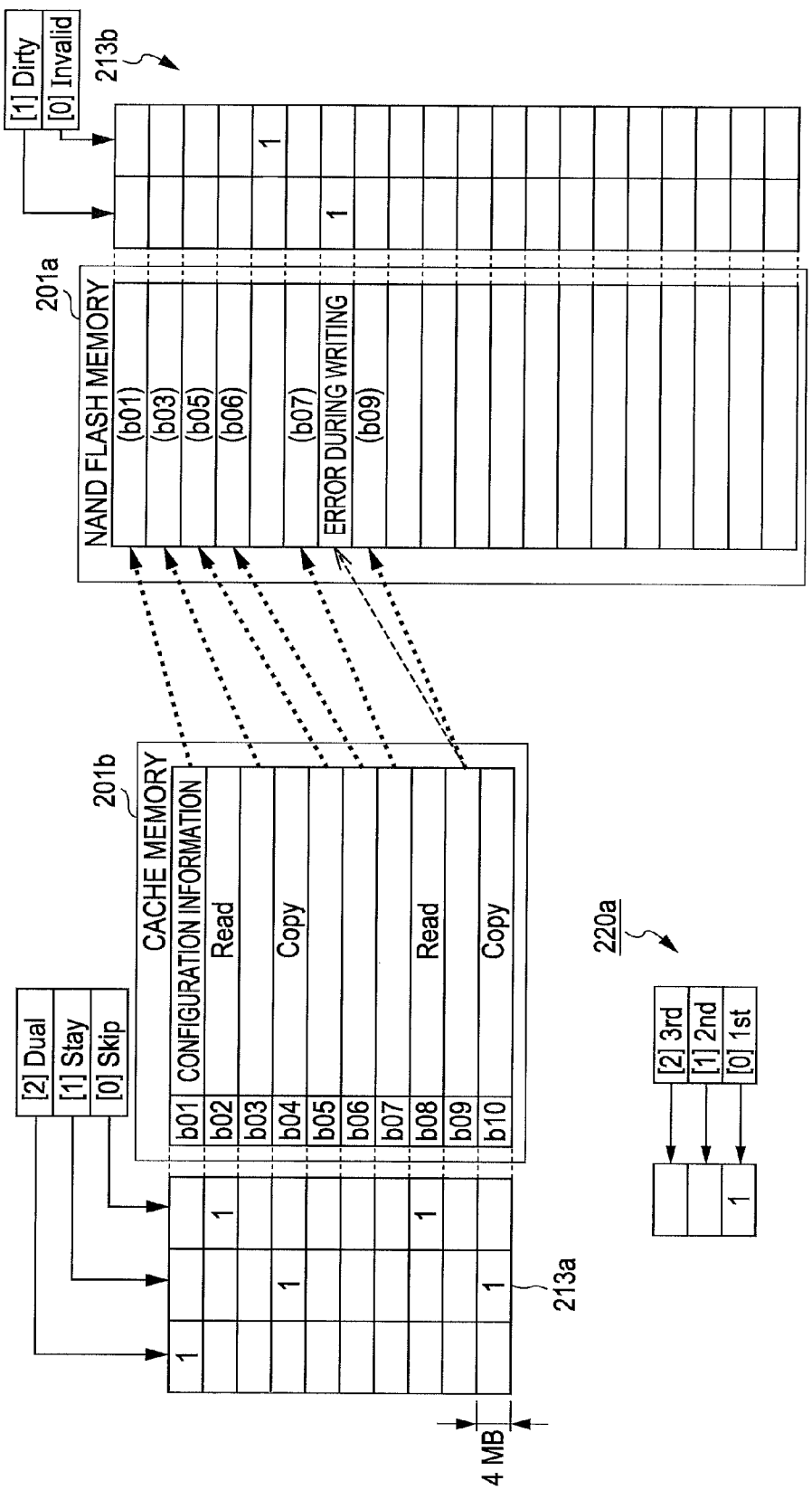
FIG. 15 illustrates processing of the save-processing device of the present embodiment when power failure occurs.

The data read by the read controller 222 are sent to the CRC generator 214d2, which adds a CRC code to the data in step S4002. In step S4003, by referring to the invalid-block management table (TBM) 213b, the NAND write controller 214e writes the CRC-code-added data to, in the NAND flash memory 201a, the block whose "invalid" flag [0] or "dirty" flag [1] does not indicate "1", as illustrated in FIG. 15.

During the writing, the names (e.g., b01 and so on) of the tables in the cache memory 201b from which the data are read by the read controller 222 may also be added to the read data in conjunction with the CRC code. With this arrangement, during cache recovery when power is restored, the FPGA 201c may re-store, in the tables b01 to b10 in the cache memory 201b, the same data as the data stored during the power failure, by referring to the table names added to the data.

In this case, in step S4004, each time data is written to the block in the NAND flash memory 201a, the NAND write controller 214e checks the internal state of the NAND flash memory 201a to verify whether or not a write error occurs.

When it is determined in step S4005 that the written data has an error, the process proceeds to step S4006 in which the error-sending unit 214a4 controls the monitoring-FPGA interface controller 216 to send, to the monitoring FPGA 201h, an error log indicating which block has an error. In step S4007, the NAND write controller 214e updates the "invalid" flag [1] in the area, included in the invalid-block management table (TBM) 213b and associated with the erroneous block in the NAND flash memory 201a, to "1". Thereafter, the process returns to step S4003. As described above, in the processing in step S4003, by referring to the invalid-block management table (TBM) 213b, the NAND write controller 214e writes the data to the block whose "invalid" flag [0] or "dirty" flag [1] does not indicate "1". Thus, no data is written to the block in which an error occurred.

For example, as illustrated in FIG. 15, when the data in the table b09 in the cache memory 201b is stored in the block a07 in the NAND flash memory 201a and an error is detected in the verification, the NAND write controller 214e rewrites the data to the next block a08.

When it is determined in step S4005 that the written data has no error, i.e., the data is properly written, the process proceeds to step S4008 in which the main controller 214a checks whether or not all of the corresponding data in the cache memory 201b are written. When not all of the data are written, the process returns to step S4001 in which next data is read from the cache memory 201b and processing as described above is performed until all of the data are transferred.

Figure 16:
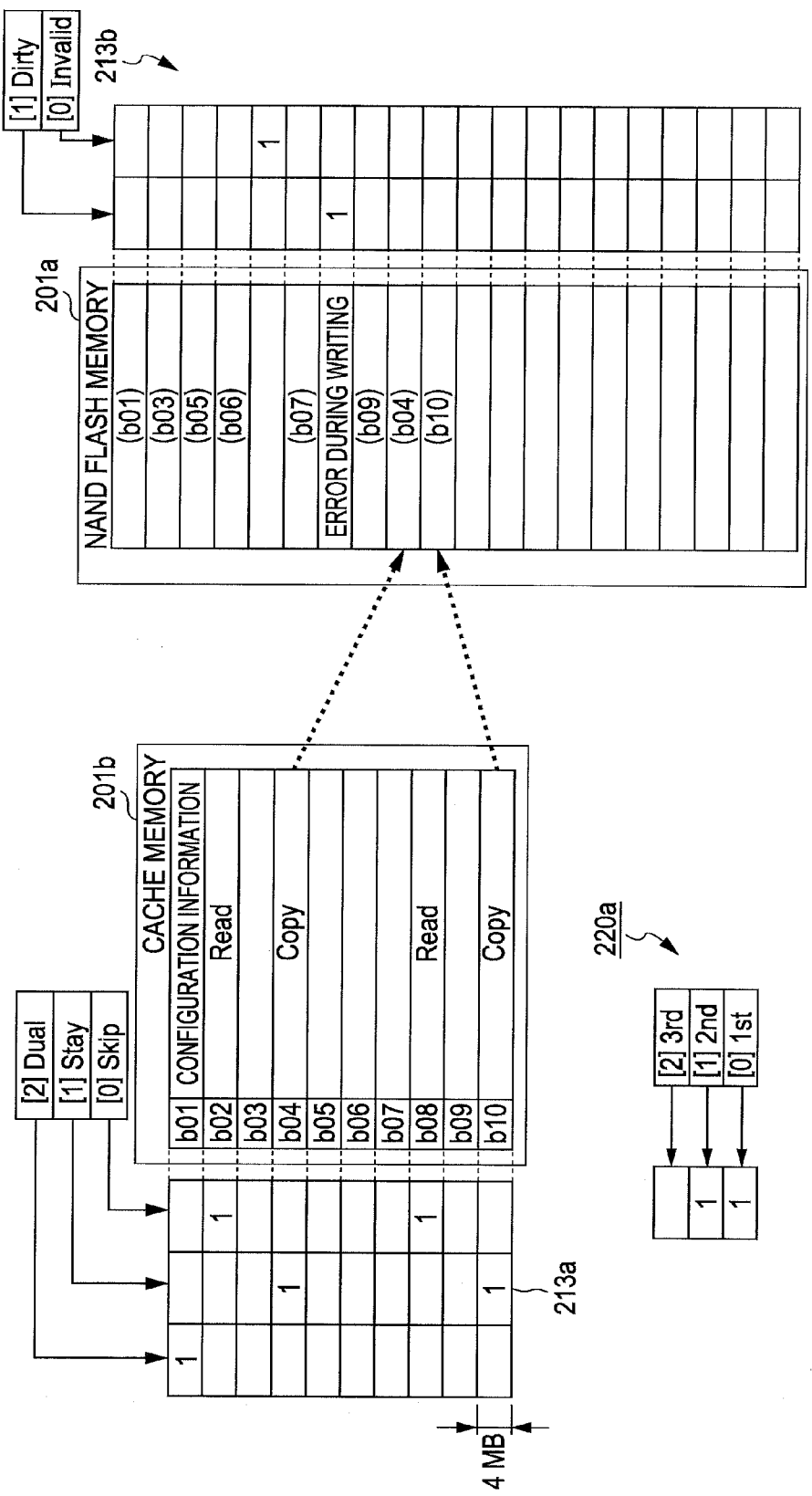
FIG. 16 illustrates processing of the save-processing device of the present embodiment when power failure occurs.
Figure 17:
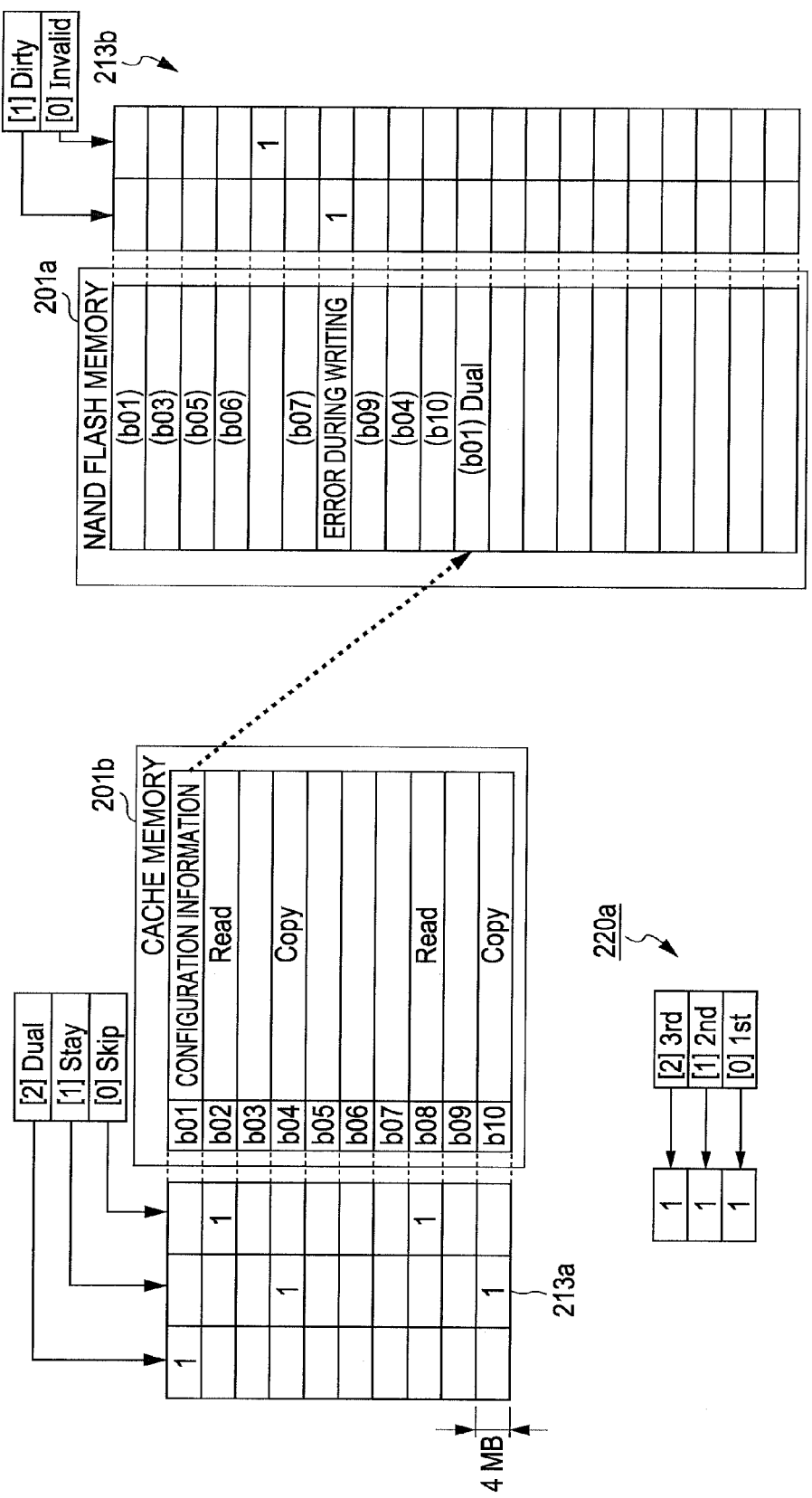
FIG. 17 illustrates processing of the save-processing device of the present embodiment when power failure occurs.
Figure 18:
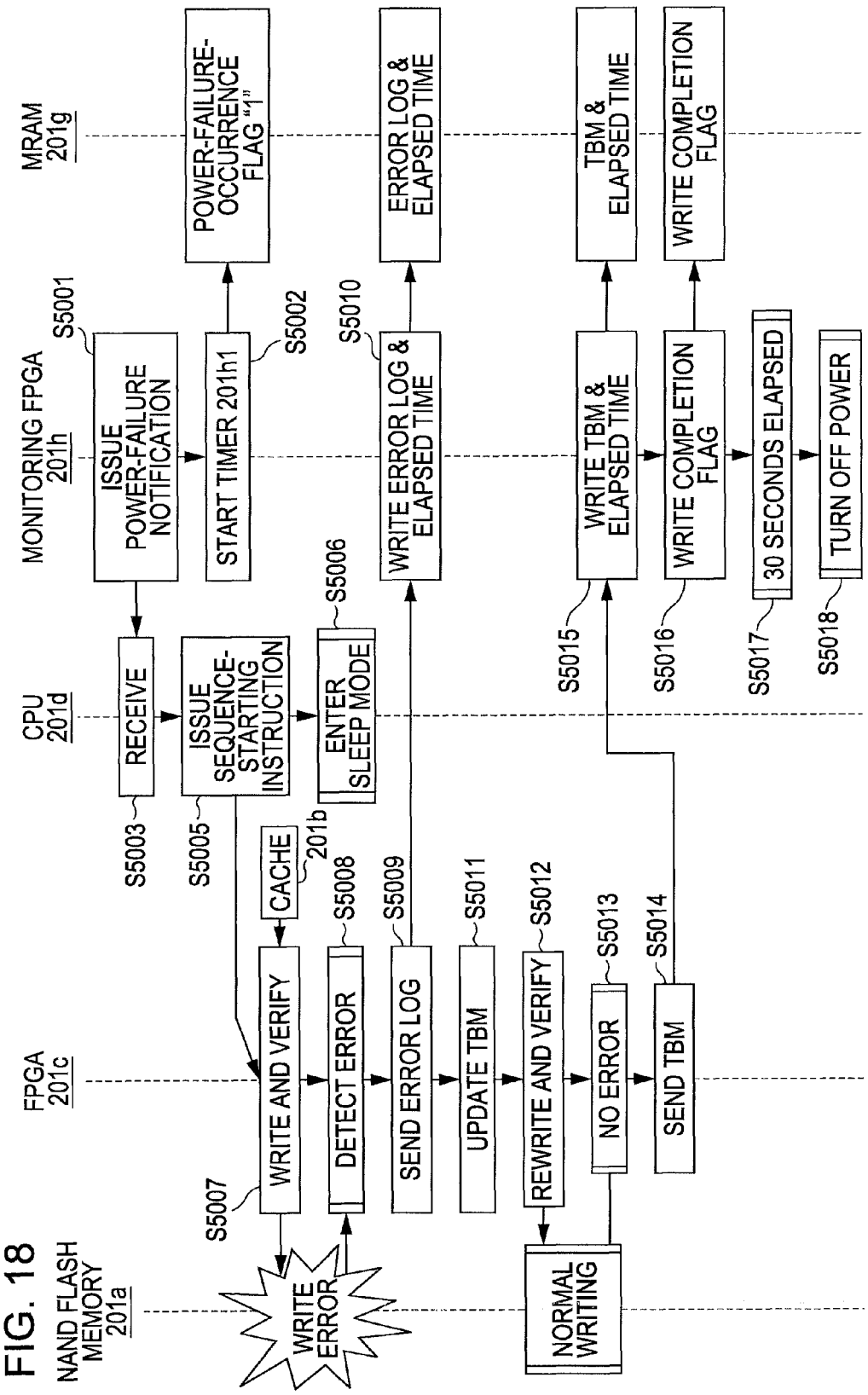
FIG. 18 is a sequence chart illustrating processing of the save-processing device of the present embodiment when power failure occurs.

When it is determined in step S4008 that all of the corresponding data in the cache memory 201b are written, the main controller 214a performs processing as described below in steps S3002, S3003, and S3004. Specifically, in step S3002, the main controller 214a sets "1" for the flag at the bit [0] (1st) of the backup completion flag 220a, as illustrated in FIG. 15. In the case of step S3003, the main controller 214a sets "1" for the flag at the bit [1] (2nd) of the backup completion flag 220a, as illustrated in FIG. 16. In the case of step S3004, the main controller 214a sets "1" for the flag at the bit [2] (3rd) of the backup completion flag 220a, as illustrated in FIG. 17. In this processing, the data included in the tables b02 and b08 stored in the cache memory 201b and associated with the 3-bit flags c02 and c08 whose "Skip" flags indicate "1" are not stored into the NAND flash memory 201a. In other words, corresponding pieces of data are not backed up.

As described above, in the present embodiment, when cache data is backed up to the NAND flash memory 201a during power failure, the determination of the backup priority of the cache data and the determination of whether or not the backup is to be performed are performed based the 3-bit flags.

With this arrangement, during power failure, important information (such as configuration information) and data (such as write data) that are likely not to be stored on any of the HDDs 203a to 203z may be first stored in the NAND flash memory 201a. Since the SCU 201e may only temporarily supply power as described above, performing data backup earlier increases the reliability of the backup. That is, in the present embodiment, more important data is backed up with higher priority.

In addition, particularly important data is subjected to the dual writing after other data are backed up, thereby making it possible to achieve more reliable backup. In the present embodiment, the second writing of the dual writing is performed after storage of data having low backup priority, such as data based on a copy instruction, is completed. As described above, at an earlier stage after power failure occurs, data are stored in the NAND flash memory 201a after the CRC-based write checking is performed at least once. That is, the data are written in the first writing with a certain level of reliability. The second writing is, therefore, meant to provide insurance for data storage against an unlikely event in which the data written in the first writing are lost.

In the present embodiment, the FPGA 201c performs processing for the backup processing. This is based on the high-speed and power-saving operations of the FPGA 201c. The CPU 201d, the FPGA 201c, and the monitoring FPGA 201h when the above-described processing is performed will now be described with reference to FIG. 18.

When the monitoring FPGA 201h detects a power failure, it sends a power-failure notification to the CPU 201d (in step S5001) and also starts the timer 201h1 (in step S5002).

The monitoring FPGA 201h also stores, in the MRAM 201g, a power-failure-occurrence flag indicating that power failure occurred. These processing operations are based on the processing operations in steps S2001 to S2003 illustrated in FIG. 10.

Upon receiving the power-failure notification from the monitoring FPGA 201h (in step S5003), the CPU 201d issues a sequence-starting instruction to the FPGA 201c (in step S5005) and then enters a sleep mode (in step S5006). These processing operations are based on the processing operations described above and illustrated in FIG. 11.

Upon receiving the sequence-starting instruction, the FPGA 201c performs writing to the NAND flash memory 201a and performs verification (in step S5007). Upon detecting a write error in the verification (in step S5008), the FPGA 201c sends an error log to the monitoring FPGA 201h (in step S5009) and updates the invalid-block management table (TBM) 213b (in step S5011). These processing operations are based on the processing operations illustrated in FIG. 14.

Upon receiving the error log, the monitoring FPGA 201h writes the error log, together with the elapsed time of the timer 201h1, to the MRAM 201g (in step S5010). This processing operation is based on the processing operations in steps S2004 and S2005.

After the processing in step S5010, the FPGA 201c performs re-writing and so on (in steps S5011 to S5013). When the writing of the cache data in the cache memory 201b to the NAND flash memory 201a is completed, the FPGA 201c sends the invalid-block management table (TBM) 213b to the monitoring FPGA 201h (in step S5014). These processing operations are based on the processing operations in steps S2006 and S2007 illustrated in FIG. 10.

Upon receiving the invalid-block management table (TBM) 213b, the monitoring FPGA 201h writes the invalid-block management table (TBM) 213b, together with the elapsed time of the timer 201h1, to the MRAM 201g (in step S5015). The monitoring FPGA 201h then writes, to the MRAM 201g, a completion flag indicating that the writing is completed (in step S5016). Thereafter, upon detecting that the output value of the timer 201h1 indicates that 30 seconds has passed (in step S5017), the monitoring FPGA 201h turns off the power of the RAID apparatus 200 (in step S5018). These processing operations are based on the operations in steps S2008 and S2009 illustrated in FIG. 10.

Figure 19:
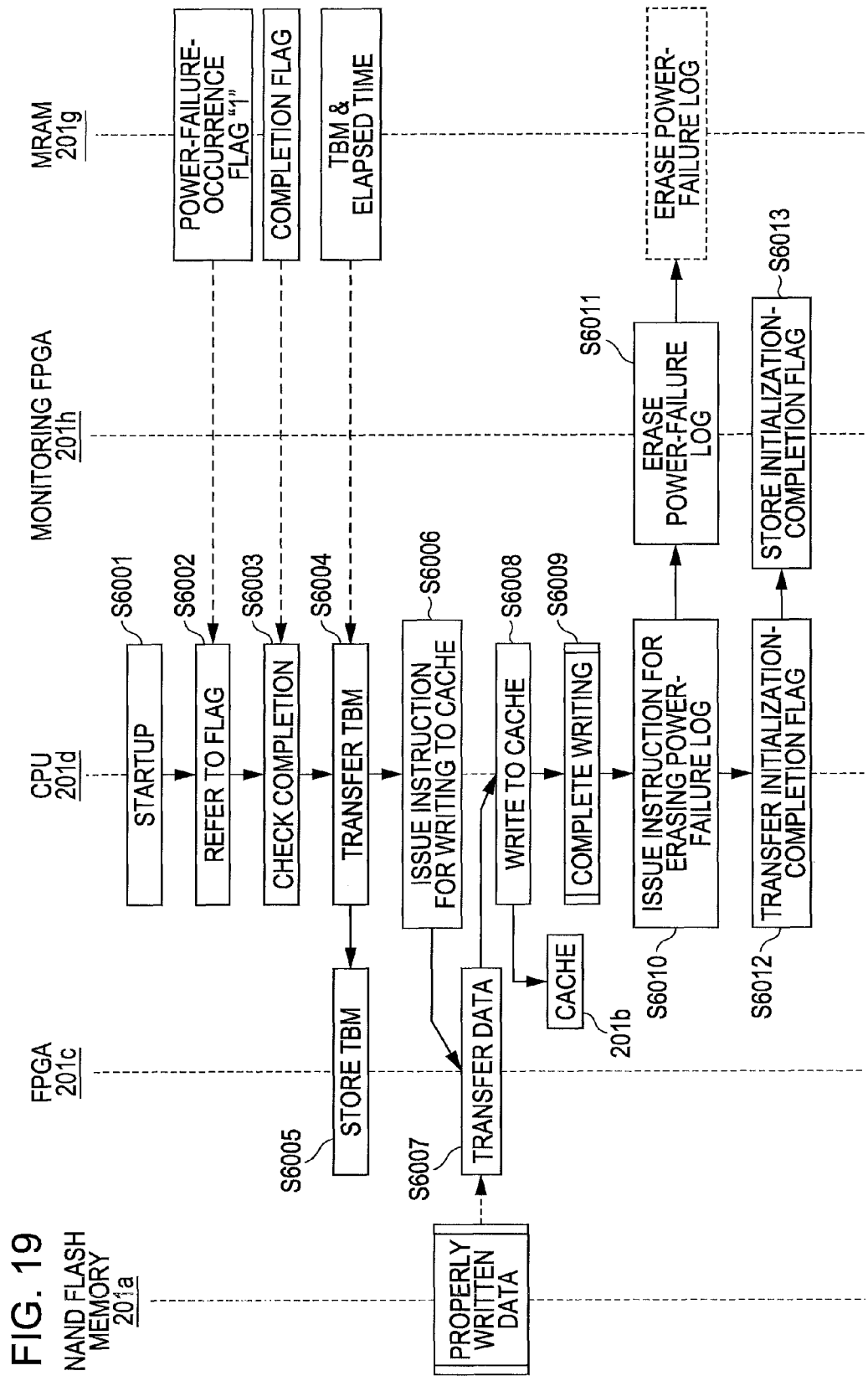
FIG. 19 is a sequence chart illustrating processing of the save-processing device of the present embodiment when power is restored.

Processing performed when power is restored will now be described with reference to FIG. 19.

First, when the CPU 201d is started up upon turning on the power again (in step S6001), the CPU 201d refers to the MRAM 201g to check whether or not a power-failure-occurrence flag is stored therein (in step S6002). When no power-failure generation flag is stored, subsequent processing illustrated in FIG. 19 is not preformed and a normal operation is performed.

After step S6002, the CPU 201d checks whether or not a completion flag is stored in the MRAM 201g (in step S6003). When no completion flag is stored, the CPU 201d determines that a cache-writing failure occurred and performs a normal operation without performing recovery of the cache memory 201b.

When a completion flag is stored, i.e., when it is determined that the writing is completed, the invalid-block management table (TBM) 213b stored in the MRAM 201g is transferred to the FPGA 201c (in step S6004).

Upon receiving the invalid-block management table (TBM) 213b, the FPGA 201c stores the received invalid-block management table (TBM) 213b (in step S6005).

Subsequently, an instruction for writing to the cache memory 201b is issued from the CPU 201d to the FPGA 201c (in step S6006). In response to the instruction, the FPGA 201c transfers the cache data, stored in the NAND flash memory 201a, to the CPU 201d (in step S6007) while referring to the invalid-block management table (TBM) 213b, as appropriate.

The CPU 201d writes the transferred cache data to the cache memory 201b (in step S6008). When the writing to the cache memory 201b is completed (in step S6009), the CPU 201d issues, to the monitoring FPGA 201h, an instruction for erasing all of the contents (the power-failure log) stored in the MRAM 201g (in step S6010).

Upon receiving the instruction, the monitoring FPGA 201h erases the contents of the power-failure log stored in the MRAM 201g (in step S6011).

The CPU 201d then transfers, to the monitoring FPGA 201h, a flag indicating that initialization of the cache memory 201b is completed (in step S6012). Upon receiving the flag, the monitoring FPGA 201h stores the flag (in step S6013). Thereafter, the processing during the power restoration ends.

Through the processing operations described above, the cache is recovered during the power restoration.

As described above, in the present embodiment, the CPU 201d is not used to transfer the data in the cache memory 201b to the NAND flash memory 201a during power failure. The CPU 201d may be implemented by a general-purpose processor and may achieve complicated processing for controlling the RAID. However, although complicated processing is possible, the power consumption is generally high. Accordingly, when other elements, such as the FPGA 201c and the monitoring FPGA 201h, used during power failure are provided as in the present embodiment, writing to the MRAM 201g may be performed without use of the CPU 201d during the power failure. It is, however, difficult for the FPGA 201c and the monitoring FPGA 201h to perform complicated processing at a higher speed because of their power consumption.

Thus, in the related art described above, with a CPU, it has been difficult to perform complicated processing, such as error-log generation, performed during power failure. The error log may take a tabular form that stores, for example, information indicating which block is a newly determined invalid block when the FPGA 201c performs writing during power failure.

In the present embodiment, without performing complicated processing such as storing files at a time, the monitoring FPGA 201h is provided with the timer 201h1 and the error log is stored together with the elapsed time received from the FPGA 201c, to realize equivalent storage processing. With this arrangement, without performing complicated processing such as recording information to one file, it is possible to check, in the NAND flash memory 201a, a block in which an error is detected, by referring to the error log stored in the MRAM 201g.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control apparatus that saves data which is stored in a cache memory of a storage when a power supply from a power supply unit to the storage is stopped, the control apparatus comprising:

a capacitor to store electric power supplied from the power supply unit and to supply the stored electric power to the control apparatus when the power supply from the power supply unit is stopped;

a first nonvolatile memory;

a second nonvolatile memory;

a first controller; and a second controller coupled to the first controller, the first controller to:

write the data, stored in the cache memory, into the first nonvolatile memory when the external power supply is stopped, verify whether the data stored in the first nonvolatile memory is normal, and send, to the second controller, log information for an address of the first nonvolatile memory in which writing of the data fails when the verification indicates that the writing to the address of the first nonvolatile memory is failure, and the second controller to write the log information for the address of the first nonvolatile memory sent from the first controller into the second nonvolatile memory.

2. The control apparatus, according to claim 1, wherein the log information includes an elapsed time from detection of the stoppage of the power supply from the power supply unit, for the address of the first nonvolatile memory in which the writing of the data fails.

3. The control apparatus according to claim 1, wherein the second controller stops the power supply to the control apparatus when a predetermined amount of time has elapsed after detection of the stoppage of the power supply from the power supply unit.

4. The control apparatus according to claim 1, further comprising:

a management memory, wherein the first controller generates a management table that identifies the address of the first nonvolatile memory in which writing of the data fails when the verification indicates that the writing is failure, stores the generated management table into the management memory, and sends, to the second controller, the generated management table, wherein the second controller writes the generated management table received from the first controller into the second nonvolatile memory.

5. A control method for saving data, by a control apparatus, which is stored in a cache memory of a storage when a power supply from a power supply unit to the storage is stopped, the control apparatus including a first nonvolatile memory, a second nonvolatile memory, a first controller, a second controller, and a capacitor to store electric power supplied from the power supply unit and to supply the stored electric power to the control apparatus when the power supply from the power supply unit is stopped, the control method comprising:

writing, by the first controller, the data stored in the cache memory into the first nonvolatile memory when the external power supply is stopped, verifying, by the first controller, whether the data stored in the first nonvolatile memory is normal, and sending to the second controller, by the first controller, log information for an address of the first nonvolatile memory in which writing of the data fails when the verification indicates that the writing to the address of the first nonvolatile memory is failure; and writing, by the second controller, the sent log information for the address of the first nonvolatile memory into the second nonvolatile memory.

6. The control method according to claim 5, further comprising
stopping, by the second controller, the power supply to the control apparatus when a predetermined amount of time has elapsed after detection of the stoppage of the external power supply.

7. The control method according to claim 5, further comprising
generating, by the first controller, a management table that identifies the address of the first nonvolatile memory in which writing of the data fails when the verification indicates that the writing is failure; and
storing, by the first controller, the generated management table into management memory,
wherein the sending sends to the second controller the generated management table,
wherein the second controller writes the generated management table received from the first controller into the second nonvolatile memory.

* * * * *